US011931869B2

(12) United States Patent
White et al.

(10) Patent No.: US 11,931,869 B2
(45) Date of Patent: Mar. 19, 2024

(54) POWERED AND CORDLESS BOX WRENCH DEVICE TO EASE DIFFICULTY IN TURNING HARD-TO-REACH FASTENERS

(71) Applicants: Jacob D White, Martinsville, IN (US); Andrew L Walters, Marana, AZ (US)

(72) Inventors: Jacob D White, Martinsville, IN (US); Andrew L Walters, Marana, AZ (US)

( * ) Notice: Subject to any disclaimer, the term of this patent is extended or adjusted under 35 U.S.C. 154(b) by 546 days.

(21) Appl. No.: 17/100,856

(22) Filed: Nov. 21, 2020

(65) Prior Publication Data

US 2021/0154806 A1 May 27, 2021

Related U.S. Application Data

(60) Provisional application No. 62/938,998, filed on Nov. 22, 2019.

(51) Int. Cl.

| | |
|---|---|
| ***B25B 21/00*** | (2006.01) |
| ***B25F 5/00*** | (2006.01) |
| ***B25F 5/02*** | (2006.01) |

(52) U.S. Cl.

CPC .............. *B25B 21/00* (2013.01); *B25F 5/001* (2013.01); *B25F 5/02* (2013.01)

(58) Field of Classification Search

CPC ....... B25F 5/001; B25B 23/00; B25B 23/007; B25B 21/00; B25B 21/002

USPC .............................................. 81/57.11–57.14

See application file for complete search history.

(56) References Cited

U.S. PATENT DOCUMENTS

| | | | | | |
|---|---|---|---|---|---|
| 4,561,329 | A | | 12/1985 | Lack | |
| 4,974,475 | A | * | 12/1990 | Lord | B25B 21/004 81/57.13 |
| 5,280,740 | A | | 1/1994 | Ersnt | |
| 5,709,136 | A | * | 1/1998 | Frenkel | B25B 23/0021 81/57.13 |
| 6,330,842 | B1 | * | 12/2001 | Brun | B25B 21/004 81/57.39 |
| 6,971,292 | B2 | | 12/2005 | Hu | |
| 7,090,030 | B2 | * | 8/2006 | Miller | B25F 5/026 173/217 |
| 9,321,154 | B2 | | 10/2016 | Chen et al. | |
| 9,993,911 | B1 | | 6/2018 | Santangelo | |
| 2006/0219060 | A1 | | 10/2006 | Miner | |
| 2008/0041199 | A1 | | 2/2008 | Hsich | |
| 2008/0289843 | A1 | * | 11/2008 | Townsan | B25B 23/0028 173/217 |
| 2009/0090220 | A1 | * | 4/2009 | Kimberly | B25B 21/00 81/57.29 |
| 2017/0021478 | A1 | * | 1/2017 | Junkers | F16B 39/24 |
| 2018/0071901 | A1 | * | 3/2018 | Silha | B25B 23/1425 |

* cited by examiner

*Primary Examiner* — Tom Rodgers

(74) *Attorney, Agent, or Firm* — Ritchison Law Offices, PC; John D Ritchison

(57) ABSTRACT

A powered and cordless box wrench able to reach and turn fasteners in tight locations consisting of a hex insert with retention features and a hex opening for fasteners, a tool head frame and cover with a recess for a drive shaft, at least one battery, polarity switch button and arm, a power button and arm, and a drive motor with a set of planetary gears and ring, plus a lockout wheel where the hex insert may be secured by the tool head and driven by the motor, planetary gears and drive shaft to ease the difficulty in turning hard to reach fasteners.

19 Claims, 17 Drawing Sheets

Overall View

Overall View

Concept and First Iteration

Second Iteration

Final Iteration
Cordless Box Wrench Prototype

Exploded Views

Body Cone
Chromium-Vanadium w/ Chrome Plating
Drop Forged

Lockout Arm
Hardened Steel w/ Zinc
Dichromate coating
Machined

Lockout Arm Handle
ABS Molded

Bevel Ring Gear
Molded Glass Filled Nylon 98
96
95
97

Bevel Gear and Driveshaft
Hardened Steel w/ Zinc
Dichromate coating
Extruded and machined Tool Head Frame
Chromium-Vanadium
w/ Chrome Plating
Drop Forged Tool Head Cover
Chromium-Vanadium
w/ Chrome Plating
Drop Forged 61
62
63
63,64
65
66
68

Typical Insert
Hardened Steel Machined

Body Shell
ABS 3 D Printed

POWERED AND CORDLESS BOX WRENCH DEVICE TO EASE DIFFICULTY IN TURNING HARD-TO-REACH FASTENERS

CROSS-REFERENCE TO RELATED APPLICATIONS

This application claims the benefit of U.S. Provisional Patent Application with Ser. No. 62938998 filed Nov. 22, 2019, by Jacob D. White and Andrew L. Walters. The application was entitled "A powered and cordless box wrench device to ease difficulty in turning hard-to-reach fasteners".

FIELD OF INVENTION

This invention is in the field of handheld tools, ratcheting tools, open end tools, tools, and wrenches manual, electric, battery, hydraulic, air or otherwise powered. The present invention relates to hand tools, and to an insertion type hand tool and is installed to the connecting portion so that the driving portion can be adjusted in two directions. This relates to a wrench, and particularly to a through-hole type power ratchet wrench having a reversal function. The present invention relates to a fastener-driving tool assembly for tightening/loosening fasteners. This invention relates to battery operated ratchet tools. It relates to wrenches having a ratcheting function and more particularly, to a ratchet wrench which is characterized by a relatively thin housing and permits the socket and housing to fit into a smaller work space than is possible with conventional ratchet wrenches.

FEDERALLY SPONSORED RESEARCH

None.

SEQUENCE LISTING OR PROGRAM

None.

BACKGROUND-FIELD OF INVENTION AND PRIOR ART

This section is not Applicable to Provisional Applications. However, as far as known, there are no powered and cordless box wrench device to ease difficulty in turning hard-to-reach fasteners or the like. It is believed that this product is unique in its design and technologies.

Background

Removing nuts and bolts in tight, hard-to-reach locations can be tiring and time consuming. The current tools and methods of removing fasteners do not relieve this pain due to the use of a socket, human effort and or bulky equipment. The Cordless Box Wrench will relieve this pain by eliminating the need for a traditional socket and maintaining the low profile of a traditional box wrench.

Current methods of loosening and tightening threaded fasteners, such as nuts and bolts, can be performed using one of three methods: manually with a traditional wrench, manually with a ratcheting box wrench or powered with an electric socket wrench. Frequently, the fastener is in a tight location that does not allow for the use of an electric socket wrench and using a traditional manual wrench is difficult and time consuming. Feedback from potential customers working in a range of industries, indicates a clear need for a fourth type of tool that can reach in tight locations and has the power of an electric socket wrench. The goal of this invention is to create this fourth type of tool, combining the low profile of a ratcheting box wrench with the power of a battery or air powered tool in order to loosen or tightening threaded fasteners easily and properly in these confined spaces. Focus groups from extensive numbers of potential customers have demonstrated the desired features, functional requirements, and industry standards. In addition, it showed that there is extensive interest and demand in the marketplace for the powered and cordless box wrench device. Results of validation testing confirm that the Cordless and ered Box Wrench has the potential to meet or exceed all customer requirements and exceed the performance capabilities of current tool offerings and their application capability. With its features and significant market potential, the device is worthy and ready to be commercialized.

In the automotive repair industry, the amount of time spent on a repair job is extremely important, as most technicians are paid by the job and not by the hour. If a technician is working on a job that is billed for four hours of labor, but the technician puts in two hours of labor, then he or she still gets paid for the four hours billed. Technicians rely on their tools, and the technician is only as good as the tools in his or her arsenal. Tools available on the market are currently manual hand tools, pneumatic, and electric, either cordless or not. Cordless power tools, like a cordless impact wrench or cordless ratchet, are becoming very popular with mechanics due to these tools being able to deliver similar performance as the tried and true pneumatic tools. However, the pneumatic tools are limited by the form of air delivery: the air hose. This bulky hose limits where the tool can be used and must normally have a compressor or large storage tank supplying air to operate the tool. Cordless tools are proving to be a popular choice for technicians, as well as contractors and do-it-yourselfers, but the cordless tools are limited as well. This limitation is by the life of the battery before its need to be re-charged. But the tools themselves can have issues too. The use of an electric ratchet requires the need for a specific socket, and this can cause having the right size socket to be difficult when trying to loosen and tighten hard to reach fasteners. Technicians are forced to revert and to use a traditional box wrench hand tool or a ratcheting box wrench, but these require the user to manually turn the fastener with the hand tool. The flaw with this is the possibility of not being able to turn the wrench far enough, or fast enough. Therefore, the idea of the Cordless Box Wrench was created, combining the use of power tools with the use of hand tools. There is a need for a tool to be able to fit in tight locations that can loosen and tighten fasteners while saving the user time and effort.

Problem Solved

The improvement and problem solved as to powered and cordless box wrench device is to ease difficulty in turning hard-to-reach fasteners. Objectives—Reduce the effort required by the user; Keep high RPMs to quickly remove fasteners; allow the user to break and torque the bolt manually; and Remove the need for a traditional socket. This product, the Cordless Box Wrench, is designed to replace the need for a traditional electric ratchet wrench, which requires large sockets to be useful. This large socket widens the window needed to operate the tool. Other advancements include: the tool combines the idea of the electric ratchet wrench with the capabilities of a traditional box wrench or GearWrench-rtm to provide the ability of fitting in tight locations with a reduced amount of effort; the safety of the user was a key element that was not compromisable; all electrical connections were sealed to prevent shorting and shock felt by the user; the tool was needed to be constructed out of strong materials to prevent injury resulting in broken parts; and, the tool was designed for sustainability by reducing the number of moving parts, as well as incorporating a sealed bearing and oilite bushings in an attempt to reduce wear and elongate life and increase reliability. Since this tool is unique and would be the only one on the market at first, it would need to remain on the market, even after competition was established by other tool companies. It is anticipated that this product would have an impact on the world of technicians.

The powered and cordless box wrench device is novel because it combines two timeless, useful and popular tools together to create a tool that can simplify the process for a variety of customers while reducing time spent on the project. This product shows innovation in the concept of the tool itself. As stated before, no other tool like it exists. Therefore, the possibilities are endless for the tool. The tool can be used in its original intent, with the addition of a tilted head design, a one-half inch drive ratchet inserts, an extension, and other options. Therefore, the tool could be much more innovative than originally imagined.

Prior Art

As far as known, there are no powered and cordless box wrench devices to ease difficulty in turning hard-to-reach fasteners the like. It is believed that this product is unique in its design and technologies. A novelty search revealed:

A. U.S. Pat. No. 4,561,329 called a Low-Profile Ratchet Wrench issued to Lack in 1985. This is a low profile ratchet wrench which includes a handle, a housing shaped in one end of the handle, a ratchet drum rotatably mounted in the housing and provided with external teeth and a recessed tang drive, and a ratchet mechanism positioned in the housing and selectively engaging the drum teeth to facilitate rotation of the ratchet drum in either the clockwise or counter-clockwise direction responsive to rotation of the handle.

B. U.S. Pat. No. 5,280,740 named a Flexible Head Socket Wrench issued to Ernst in 1994 demonstrates a socket wrench is shown having a socket driver head pinned to a clevis on a shaft. A sleeve is receivable over the shaft end and includes open ended slots pointing away from the clevis. The shaft includes a pin press fit within a cross bore on the shaft end, and the shaft and sleeve are axially slidable relative to each other; where in one position the pin engages one of the slots, and in another position, the shaft and sleeve spin freely of each other. A handle includes an internal bore which is profiled to compressively fit over the sleeve, and a chamber is defined between the sleeve and the end of the internal bore, to provide clearance for the axial movement of the shaft and sleeve.

C. U.S. Pat. No. 6,282,990 titled a Flat Head Power Ratchet issued to Miner in 2001 portrays a low profile substantially flat head power ratchet comprising a pair of spaced shells joined together to for a housing which is tubular at one end for attachment to a pneumatic motor and flat at the other end for operating use in confined areas, said ratchet comprising a gear journaled on a post in the upper shell and a boss on the lower shell, a yoke disposed about the gear and pivotally journaled about the boss, a pair of spaced pawls confined primarily in the yoke but projecting slightly upwards therefrom, and a reversing plate pivotally disposed about the post and lying on the yoke between the pawls, said reversing plate being shaped and sized such that only one of the two pawls may be selectively engaged with the gear at any one given time.

D. U.S. Pat. No. 6,971,292 called a Fastener-Driving Tool Assembly and issued to Hu in 2005 shows a fastener-driving tool assembly includes a fastener-driving member and a coupling device. The fastener-driving member includes a first end and a second end for driving a fastener. The first end of the fastener-driving member includes a polygonal opening. The coupling device includes a first member and a second member. The second member has a polygonal end securely engaged with the polygonal opening of the fastener-driving member. The first member includes an end for engaging with the other end of the second member. The other end of the first member includes a polygonal engaging hole for engaging with one of an extension rod, a handle, and a polygonal first end of a second member of a similarly constructed coupling device.

E. U.S. Pat. No. 9,321,154 named a Through-Hole Type Power Ratchet Wrench was issued to Chen et al. in 2016 and demonstrates a through-hole type power ratchet wrench includes a socket bracket, a swingable member, a ratchet socket, first and second pawls, and first and second resilient elements. The swingable member is disposed in the socket bracket and adjacent to an outer surface of the ratchet socket. The pawls are swing ably fixed on the swingable member. The pawls, biased by the respective resilient elements, tend to engage with the outer surface of the ratchet socket. The wrench also includes a limiting member configured to isolate one of the first and second pawls from the ratchet socket. The limiting member is formed with an opening adapted for allowing one of the pawls to pass therethrough, and the limiting member is moveable about the ratchet socket between first and second positions. The opening of the limiting member faces towards the first pawl and second pawls when at the first and second positions, respectively.

F. U.S. Pat. No. 9,993,911 is called a Wrench Style Side Loading, Insert Using, Ratcheting, Open End, Pass Through, Socket, Quick Changing, Fastener Retaining, Reversible, Manual Or Powered, Variable High Speed, Torque Sensing, Flare Nut was issued to Santangelo in 2018 and provides a jaw that easily allows an insert to be installed or removed. Roughly circular, an insert will be held captive by the pins or semi-circles in the jaw engaging with a groove in the insert's circumference. This will allow the insert to rotate even with a part of its circle not engaged. This will allow an insert to be open ended. This open-ended feature will allow this tool to rotate a fastener like a nut even if the end of the threaded portion, perhaps a bolt, cannot be accessed. Once installed the insert will be able to be turned in a circular motion with heavy torque by either manual or powered means.

G. Patent application published as US 2006/0219060 named a Flat Head Reversible Power Ratchets by Miner in 2006 shows a flat headed, reversible power ratchet of relatively small size which uses integral bosses and apertures in its housing to locate and control the movement of its yoke and driving gears on bosses integral to the housing with the driving gear mounted in a bore within the yoke, which has its pawls and pawl controls within the yoke adjacent the gear, and by utilizing a pair of linkages which pivot about the yoke and about the housing in overlapping arcs to stabilize the position of the directional controls during operations.

H. Patent application published as US 2008/0041199 is called an Insertion Type Hand Tool by Hsieh in 2008 and shows an insertion type hand tool comprises a tool body having a handle; one end of the handle having a receiving groove; a connecting portion pivotally installed in the receiving groove; a lower end of the connecting portion being formed with a teethed portion; a resisting unit installed in the receiving groove; one end of the resisting unit having a teeth surface engageable to the teethed portion of the resisting unit; a lower end of the receiving groove having an adjusting unit for adjusting the resisting unit to extend so as to engage with connecting portion or to reduce so as to release from the connecting portion. The adjusting unit has an adjusting rod and an elastic unit; the adjusting rod has a recess; when the adjusting unit is pressed, the recess receives the resisting unit so that the resisting unit is released from the connecting portion.

As can be observed, none of the prior art has anticipated or caused one skilled in the art flexible and hard to reach wrenches to see this new invention by White and Walters as obvious to a person skilled in the ordinary art of the industry of powered wrenches and drive systems. The powered and cordless box wrench device to ease difficulty in turning hard-to-reach fasteners provides an answer to powered and cordless wrench systems for hard to reach applications. It is neither anticipated nor rendered obvious by the prior art found in the search.

SUMMARY OF THE INVENTION

The Cordless Box Wrench is an extremely unique tool that is designed to be able to reach fasteners in tight locations. It was designed with a list of customers in mind, all of which are equally as important as the next, while making it easy to use for anyone. However, the tool would need to produce a performance that is comparable to other cordless tools, as well as pneumatic tools. Due to the tool's unique presence, the technology had not been proven and careful designing took place for the final design and for the prototype design. The prototype was able to prove the technology.

The preferred embodiment of a powered and cordless box wrench device to ease difficulty in turning hard-to-reach fasteners A powered cordless device for turning hard to reach fasteners comprised of: (a) a hex insert with retention features and a hex opening for hex fasteners; (b) a tool head frame and a tool head cover with a recess for a drive shaft, with a means for connecting the cover to the frame, and with a hex insert container with a set of hex insert ball plungers; (c) a body cone with an aperture; (d) a body shell with a left hand body shell and a right hand body shell that contain a set of internal cavities and with an end cap; (e) at least one battery, a polarity switch button, a polarity switch arm, a power button and power button arm, and a motor with a means for motor to drive a set of planetary gears; (f) a planetary carrier with a means for interconnecting with a couple hub, a planetary ring gear, the set of planetary gears, and a ring gear retainer; (g) a lockout wheel with slots, with a bearing, with an aperture for receiving a spline, and with the couple hub; (h) a lockout arm and handle; (i) a drive shaft with the spline at one end and a bevel gear at an opposite end, the bevel gear having a set of teeth to engage a bevel ring gear; (j) a ball plunger on the tool head to removably secure the spline; and (k) the bevel ring gear with a set of teeth to engage the bevel gear and with an internal aperture/hex to engage the insert wherein the hex insert may be removably secured by the tool head and driven by the motor, planetary gears and drive shaft to ease the difficulty in turning hard to reach fasteners.

The newly invented powered and cordless box wrench device to ease difficulty in turning hard-to-reach fasteners may be manufactured at low volumes by very simple means and in high volume production by more complex and controlled systems.

Objects and Advantages

There are several objects and advantages of the powered and cordless box wrench device. There are currently no known devices that are effective at providing the objects of this invention.

The powered and cordless box wrench device to ease difficulty in turning hard-to-reach fasteners has a variety of advantages and benefits:

| Item | Advantages |
|---|---|
| 1 | Use of a strong, small ergonomic body<br>Provides protection of internal components<br>Allows for better control of tool during use<br>Comfortable to hold and use in the hand of the user<br>Allow the user to apply a torque up to 100 ft. lbs. when using Lock Out feature |
| 2 | Use a long tool arm and Lock Out feature<br>Increase reach and accessibility<br>Provide leverage without a "cheater bar"<br>Reduce the amount of torque |
| 3 | Use a low-profile head with through opening<br>Narrow the window required for use<br>Allow for nut removal on long bolts |
| 4 | Use an interchangeable head and insert<br>Allows for varying head size with bolt size while keeping cost low<br>Ball catches allow for easy changeover, decreasing overall time spent on job<br>Easier incorporation of an extension |
| 5 | |

Finally, other advantages and additional features of the present powered and cordless box wrench device to ease difficulty in turning hard-to-reach fasteners will be more apparent from the accompanying drawings and from the full description of the device. For one skilled in the art of powered tools, wrenches and like device, it is readily understood that the features shown in the examples with this product are readily adapted to other types of powered tool systems and devices.

DESCRIPTION OF THE DRAWINGS—FIGURES

The accompanying drawings, which are incorporated in and constitute a part of this specification, illustrate an embodiment of the powered and cordless box wrench device to ease difficulty in turning hard-to-reach fasteners that is preferred. The drawings together with the summary description given above and a detailed description given below explain the principles of the powered and cordless box wrench device. It is understood, however, that this device is not limited to only the precise arrangements and instrumentalities shown.

DESCRIPTION OF THE DRAWINGS—REFERENCE NUMERALS

Figure 1:
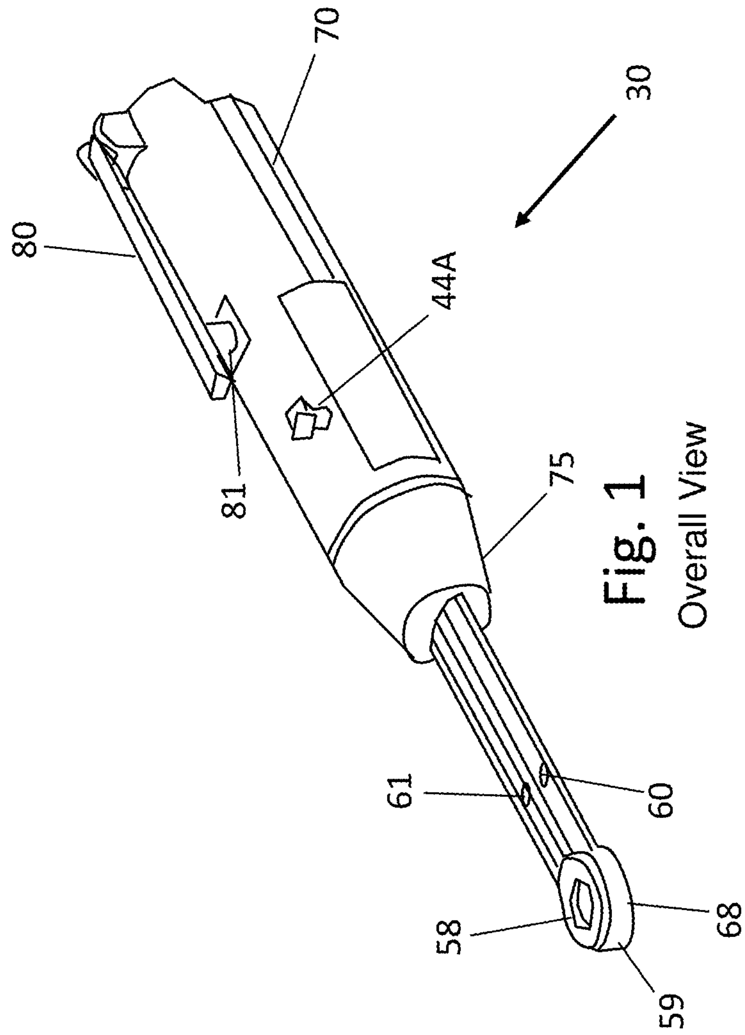
FIG. 1 is a sketch of the powered and cordless box wrench device for turning hard to reach fasteners.

The following list refers to the drawings:

TABLE B

| Ref # | Description |
|---|---|
| 30 | powered cordless device 30 for turning hard to reach fasteners |
| 31 | iteration prototype on 31 of powered cordless box wrench device 30 |
| 32 | iteration prototype two 32 of powered cordless box wrench device 30 |
| 40 | lockout wheel 40 |
| 40A | lockout slots 40A |
| 40B | couple hub 40B |
| 41 | lockout wheel hub 41 |
| 41A | lockout wheel aperture 41A |
| 42 | lockout wheel bearing 42 |
| 43 | lockout arm 43 |
| 43A | lockout wheel chisel 43A |
| 43B | lockout arm extension 43B |
| 43C | lockout arm opening 43C |
| 44 | lockout arm handle 44 |
| 44A | grip 44A |
| 44B | shaft 44B |
| 44C | extension 44C |

TABLE B-continued

| Ref # | Description |
|---|---|
| 45 | planetary carrier 45 |
| 47 | planetary ring gear 47 |
| 48 | planetary gears 48 |
| 49 | ring gear retainer 49 |
| 58 | hex insert 58 |
| 58A | external drive flats 58A for hex insert 58 |
| 58B | hex opening 58B for hex fasteners |
| 58D | diameter 58D |
| 58G | ball groove 58G |
| 59 | hex insert ball plunger 59 |
| 59A | ball plunger 59A for tool head 60, 61 at spline 98 |
| 60 | tool head frame 60 |
| 61 | tool head cover 61 |
| 62 | recess 62 for drive shaft |
| 63 | insert aperture 63 for means for connecting 64-aperture as threaded, slot, or flap |
| 64 | means for connecting 64 such as threaded fasteners, screws, bolts, tabs, barbs, etc. |
| 65 | opening/aperture 65 for insert 58 |
| 66 | opening 66 for ball plunger 59 |
| 68 | hex insert container 68 |
| 70 | body shell 70 |
| 70L | left hand 70L body shell 70 |
| 70R | right hand 70R body shell 70 |
| 70LL | length 70LL |
| 70D | diameter 70D |
| 70PG | planetary recess 70PG |
| 71 | motor cavity 71 |
| 72 | battery cavity 72 |
| 72A | batteries 72A-at least one may be rechargeable-12-volt, 6 volt, 18 volt or the like, rechargeable or standard replaceable, and metal hydride, alkaline battery, lead-acid battery, lithium-ion battery, nickel-cadmium battery, nickel metal hydride, zinc chloride battery, or the like |
| 73 | switch cavity 73 |
| 74 | battery pack container 74 |
| 75 | body cone 75 |
| 76 | body cone offset perch 76 for body shell 70 |
| 77 | taper 77 on body cone 75 |
| 78 | aperture hole 78 |
| 80 | power button arm 80 |
| 80A | power button 80A |
| 81 | polarity switch button 81 |
| 84 | polarity switch 84 |
| 85 | motor 85 |
| 85A | means 85A for motor 85 to drive planetary gears 48 shaft and gear, spline, rods, knurl |
| 90 | bevel ring gear 90 |
| 91 | teeth 91 of ring gear 90 |
| 92 | internal aperture/hex 92 |
| 93 | diameter 93 |
| 94 | thickness 94 |
| 95 | bevel gear 95 |
| 96 | drive shaft 96 |
| 97 | bevel gear teeth 97 |
| 98 | spline 98 |
| 99 | key feature 99 for alignment and ensuring the tool head can only be inserted one way |
| 99A | threaded hole 99A for screwing in a ball plunger |
| 99A | that will lock the tool head into the body cone |
| 100 | operator 100 using powered and cordless box wrench device |

DETAILED DESCRIPTION OF PERFERRED EMBODIMENT

The present development is a powered and cordless box wrench device to ease difficulty in turning hard-to-reach fasteners. This invention is in the field of handheld tools, ratcheting tools, open end tools, tools, and wrenches manual, electric, battery, hydraulic, air or otherwise powered. The present invention relates to hand tools, and to an insertion type hand tool and is installed to the connecting portion so that the driving portion can be adjusted in two directions. This relates to a wrench, and particularly to a through-hole type power ratchet wrench having a reversal function. The present invention relates to a fastener-driving tool assembly for tightening/loosening fasteners. This invention relates to battery operated ratchet tools. It relates to wrenches having a ratcheting function and more particularly, to a ratchet wrench which is characterized by a relatively thin housing and permits the socket and housing to fit into a smaller work space than is possible with conventional ratchet wrenches.

The advantages for the powered and cordless box wrench device 30 are listed above in the introduction. Succinctly the benefits are that the device:

A. Use of a strong, small ergonomic body;

B. Use a long tool arm and Lock Out feature;

C. Use a low-profile head with through opening; and

D. Use an interchangeable head and insert.

The preferred embodiment of a powered and cordless box wrench device to ease difficulty in turning hard-to-reach fasteners A powered cordless device 30 for turning hard to reach fasteners comprised of: (a) a hex insert 58 with retention features and a hex opening 58B for hex fasteners; (b) a tool head frame 60 and a tool head cover 61 with a recess 62 for a drive shaft, with a means for connecting 64 the cover to the frame, and with a hex insert container 68 with a set of hex insert ball plungers 59; (c) a body cone 75 with an aperture 78; (d) a body shell 70 with a left hand 70L body shell 70 and a right hand 70R body shell 70 that contain a set of internal cavities and with a battery pack container 74; (e) at least one battery 72A, a polarity switch 84 and a polarity switch arm 81, a power button 80A and a power button arm 80, and a motor 85 with a means 85A for motor 85 to drive a set of planetary gears 48; (f) a planetary carrier 45 with a means for interconnecting with a couple hub 40B, a planetary ring gear 47, the set of planetary gears 48, and a ring gear retainer 49; (g) a lockout wheel 40 with slots 40A, with a bearing 42, with an aperture for receiving a spline 98, and with the couple hub 40B; (h) a lockout arm 43 and handle 44; (i) a drive shaft 96 with the spline 98 at one end and a bevel gear 95 at an opposite end, the bevel gear 95 having a set of teeth 97 to engage a bevel ring gear 90; (j) a ball plunger 59A on the tool head 60,61 to removably secure the spline 98; and (k) the bevel ring gear 90 with a set of teeth 91 to engage the bevel gear 95 and with an internal aperture/hex 92 to engage the insert 58 wherein the hex insert 58 may be removably secured by the tool head 60, 61 and driven by the motor, planetary gears and drive shaft to ease the difficulty in turning hard to reach fasteners.

There is shown in FIGS. 1-17 a complete description and operative embodiment of the powered and cordless box wrench device to ease difficulty in turning hard-to-reach fasteners. In the drawings and illustrations, one notes well that the FIGS. 1-17 demonstrate the general configuration and use of this product. The various example uses are in the operation and use section, below.

The accompanying drawings, which are incorporated in and constitute a part of this specification, illustrate an embodiment of the powered and cordless box wrench device 30 to ease difficulty in turning hard-to-reach fasteners that is preferred. The drawings together with the summary description given above and a detailed description given below explain the principles of the powered and cordless box wrench device 30. It is understood, however, that the special device 30 is not limited to only the precise arrangements and instrumentalities shown. Other examples of powered and cordless tools and devices and their uses are still understood by one skilled in the art of powered tools, wrenches and like devices to be within the scope and spirit shown here.

FIG. 1 is a sketch of the powered and cordless box wrench device 30 for turning hard to reach fasteners. Shown and demonstrated here are the following components and features: a powered cordless device 30 for turning hard to reach fasteners; a grip button 44A; a hex insert 58; a hex insert ball plunger 59; a tool head frame 60; a tool head cover 61; a hex insert container 68; a body shell 70; a left hand 70L body shell 70; a right hand 70R body shell 70; a body cone 75; a power button 80A; power button arm 80; and a polarity switch button 81.

Figure 2A:
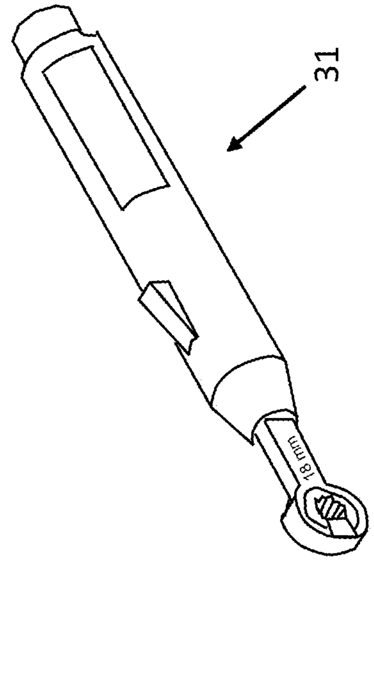
FIG. 2A through 2C are sketches of the iterations of prototypes for the powered and cordless box wrench device.
Figure 2B:
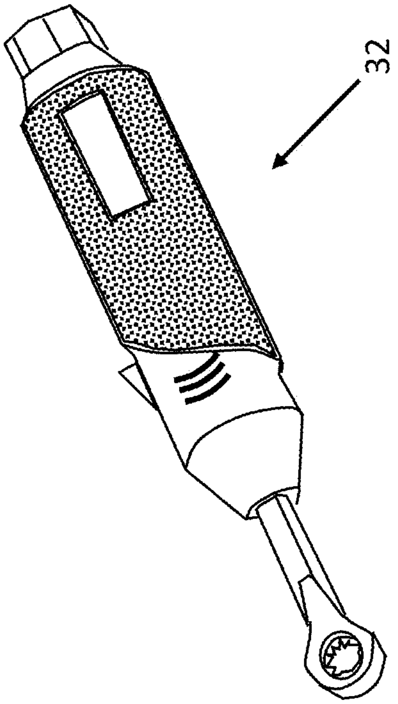
Figure 2C:
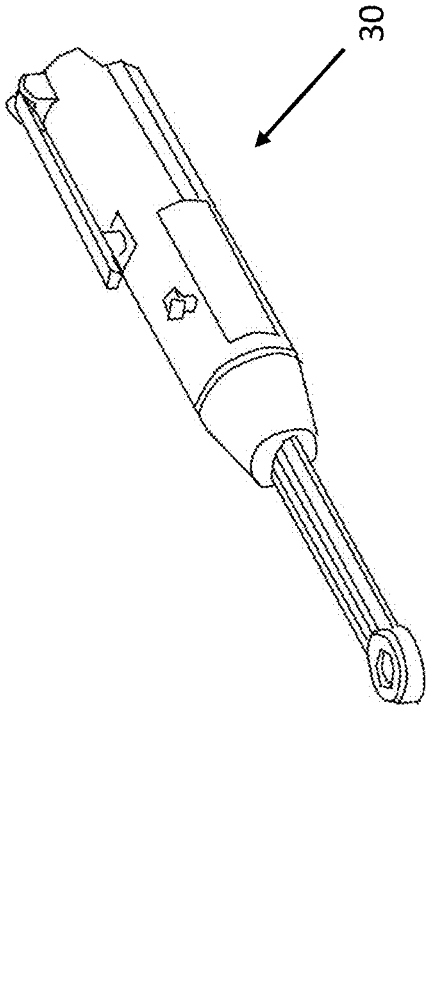

FIG. 2 A through 2 C are sketches of the iterations of prototypes for the powered and cordless box wrench device 30. In these views one may see a powered cordless device 30 for turning hard to reach fasteners; an iteration prototype on 31 of powered cordless box wrench device 30; and an iteration prototype two 32 of powered cordless box wrench device 30.

Figures 3A, 3B, 3C:
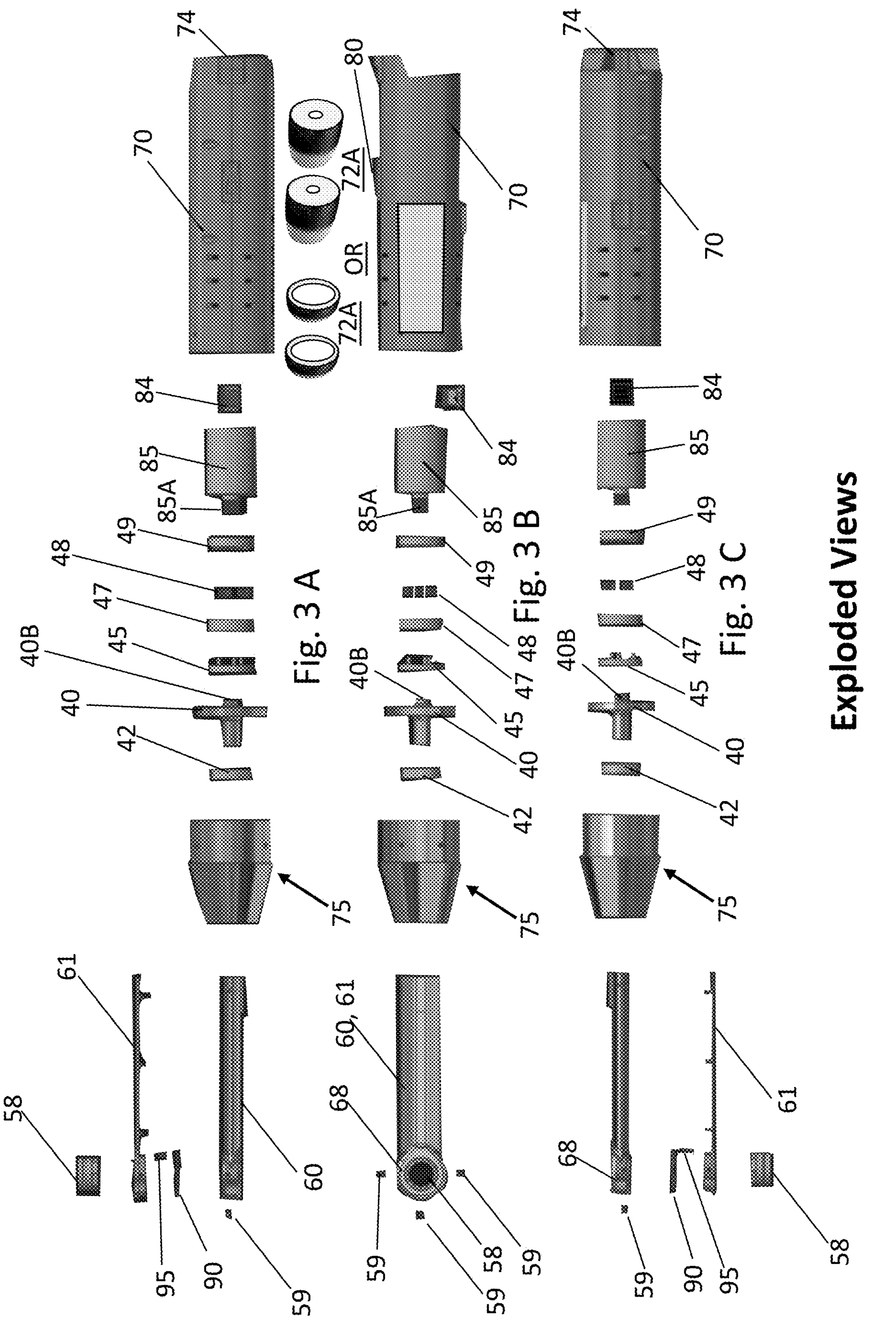
FIG. 3A through 3C are sketches of exploded views of the powered and cordless box wrench device with the components and features shown from generally a top and side views.

FIG. 3A through 3C are sketches of exploded views of the powered and cordless box wrench device 30 with the components and features shown from generally a top and side views. The various components and features portrayed here are: a powered cordless device 30 for turning hard to reach fasteners; a lockout wheel 40; a lockout wheel bearing 42; a planetary carrier 45; a planetary ring gear 47; a planetary gears 48; a ring gear retainer 49; a hex insert 58; a hex insert ball plunger 59; a tool head frame 60; a tool head cover 61; a hex insert container 68; a body shell 70; at least one or a set of batteries 72A—at least one may be rechargeable—12 volt, 6 volt, 18 volt or the like, rechargeable or standard replaceable, and metal hydride, alkaline battery, lead-acid battery, lithium-ion battery, nickel-cadmium battery, nickel metal hydride, zinc chloride battery, or the like; a battery pack container 74; a body cone 75; a power button 80A; a power button arm 80; a polarity switch 84; a motor 85; a means 85A for motor 85 to drive planetary gears 48 shaft and gear, spline, rods, knurl; a bevel ring gear 90; and a bevel pinion gear 95.

Figures 4A, 4B, 4C, 4D:
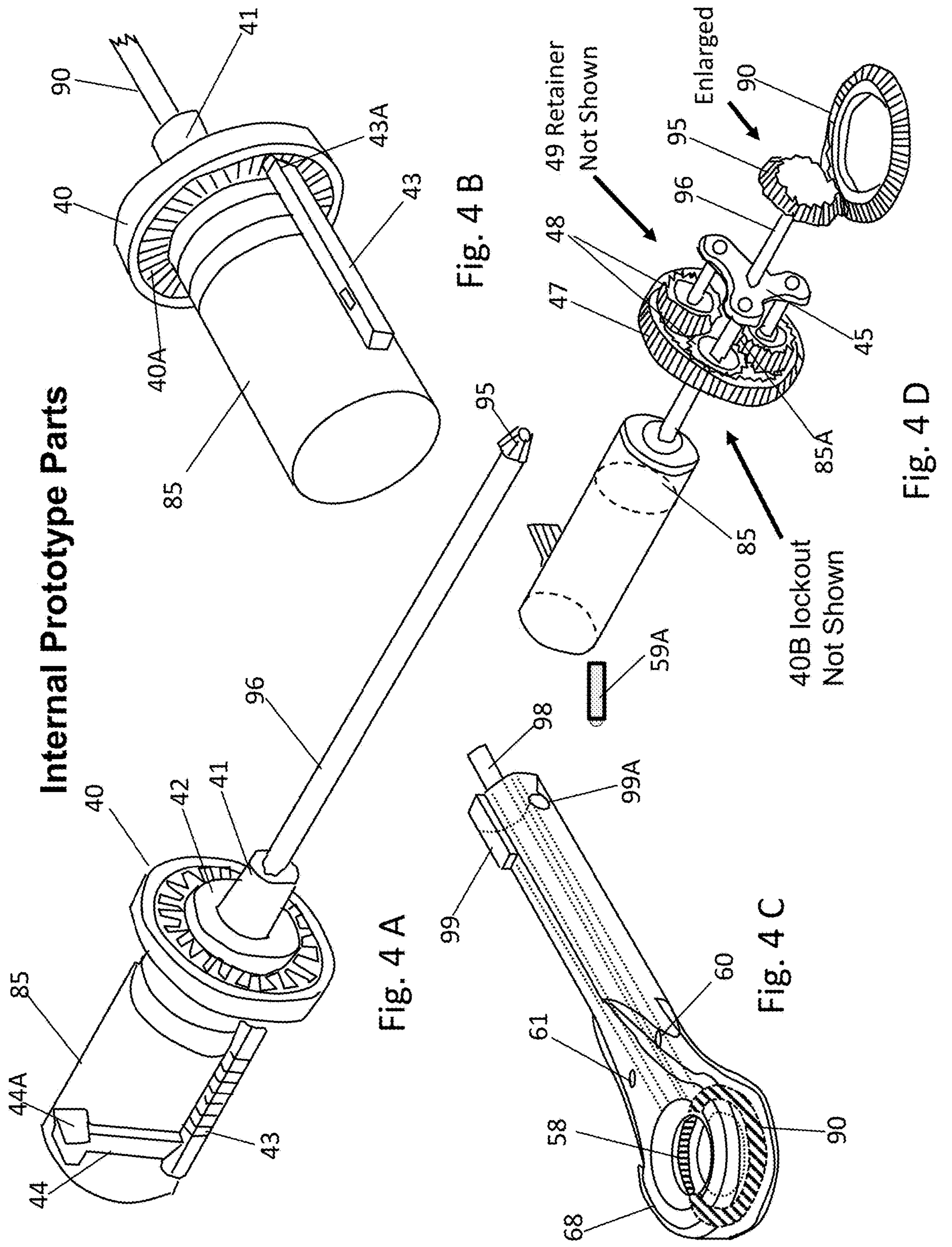
FIG. 4A through 4D are sketches of the internal parts of the powered and cordless box wrench device.

FIG. 4A through 4C are sketches of the internal parts of the powered and cordless box wrench device. These figures show the following features and components: a lockout wheel 40; a lockout slots 40A; a lockout wheel hub 41; a lockout wheel bearing 42; a lockout arm 43; a lockout wheel chisel 43A; a lockout arm handle 44; a grip button 44A; a planetary carrier 45; a planetary ring gear 47; a planetary gears 48; a hex insert 58; a ball plunger 59A for tool head 60,61 at spline 98; a tool head frame 60; a tool head cover 61; a hex insert container 68; a body shell 70; a motor 85; a means 85A for motor 85 to drive planetary gears 48 shaft and gear, spline, rods, knurl; a bevel ring gear 90; a bevel pinion gear 95; a drive shaft 96; a key feature 99 for alignment and ensuring the tool head can only be inserted one way; and a threaded hole 99A for screwing in a ball plunger 59A that will lock the tool head 60,61 into the body cone 75.

Figures 5A, 5B:
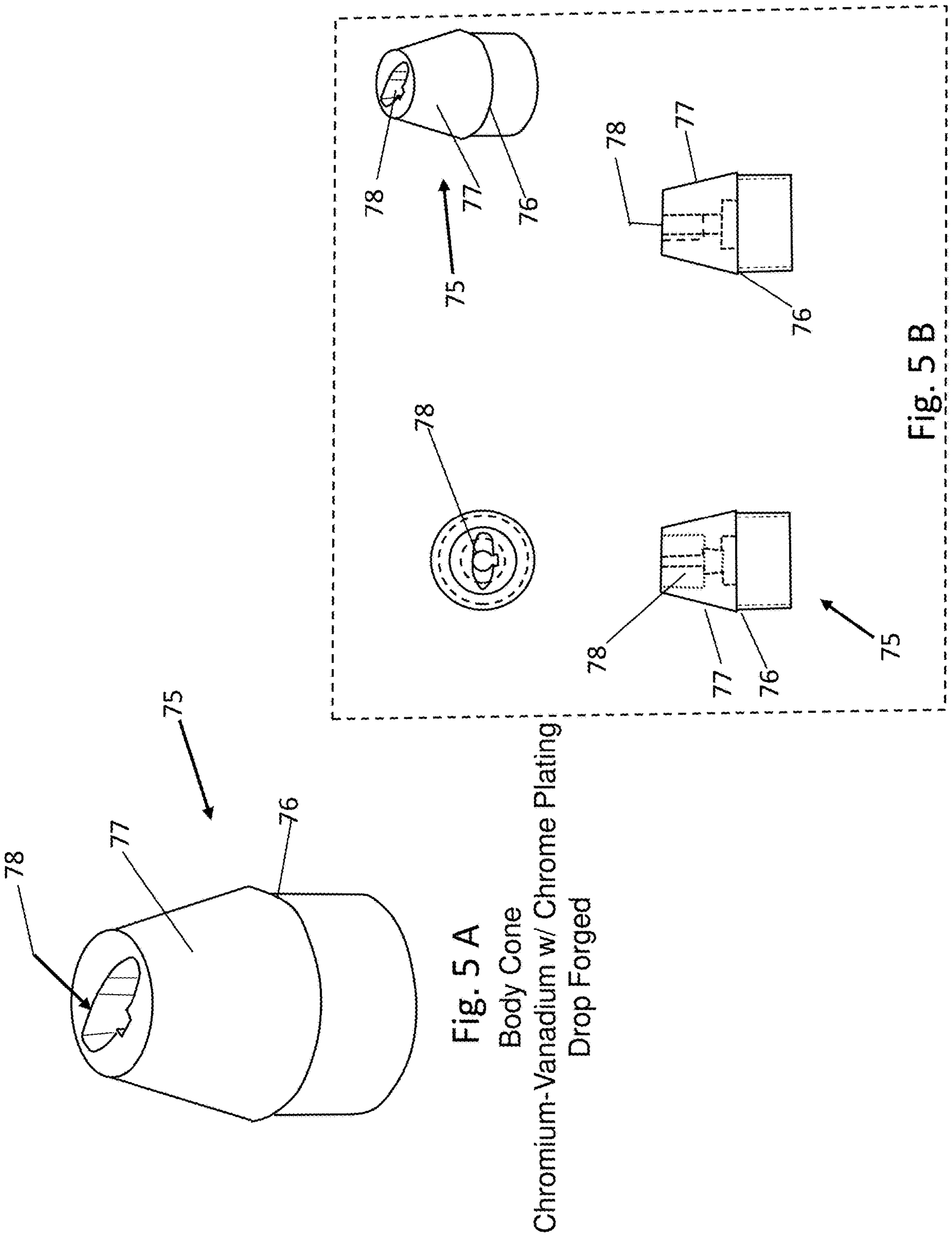
FIGS. 5A and 5B are sketches of the body cone for the powered and cordless box wrench device.

FIGS. 5A and 5B are sketches of the body cone 75 for the powered and cordless box wrench device 30. Demonstrated in these figures are a body cone 75; a body cone offset perch 76 for body shell 70; a taper 77 on body cone 75; and an aperture hole 78. The body and cone can be made of durable materials such as metals—steel alloys, nickel, brass, pot metals, aluminum, titanium and the like and polymers such as fairly high durometer, urethane, nylon, reinforced nylon, polyvinyl chloride (PVC), silicone, thermoplastic elastomers (TPE), Acrylonitrile Styrene (ASA); Acrylonitrile Butadiene Styrene (ABS) Plastic; polycarbonate—Acrylonitrile Butadiene Styrene (PC-ABS); polylactic acid (PLA); Polyamide (PA-nylon), Glass Filled Polyamide, and composite materials and the like.

Figure 6B:
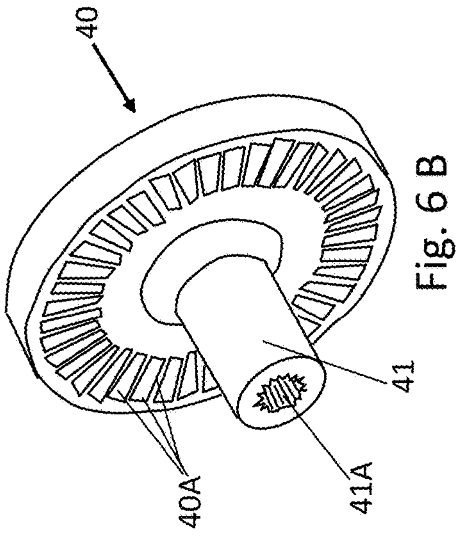
FIG. 6A through 6C are sketches of the lock out wheel and coupler for the powered and cordless box wrench device.
Figure 6A:
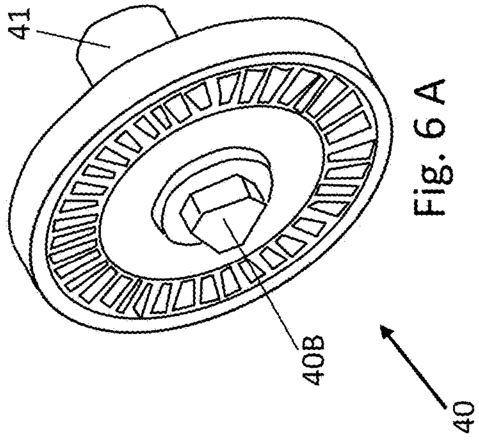
Figure 6C:
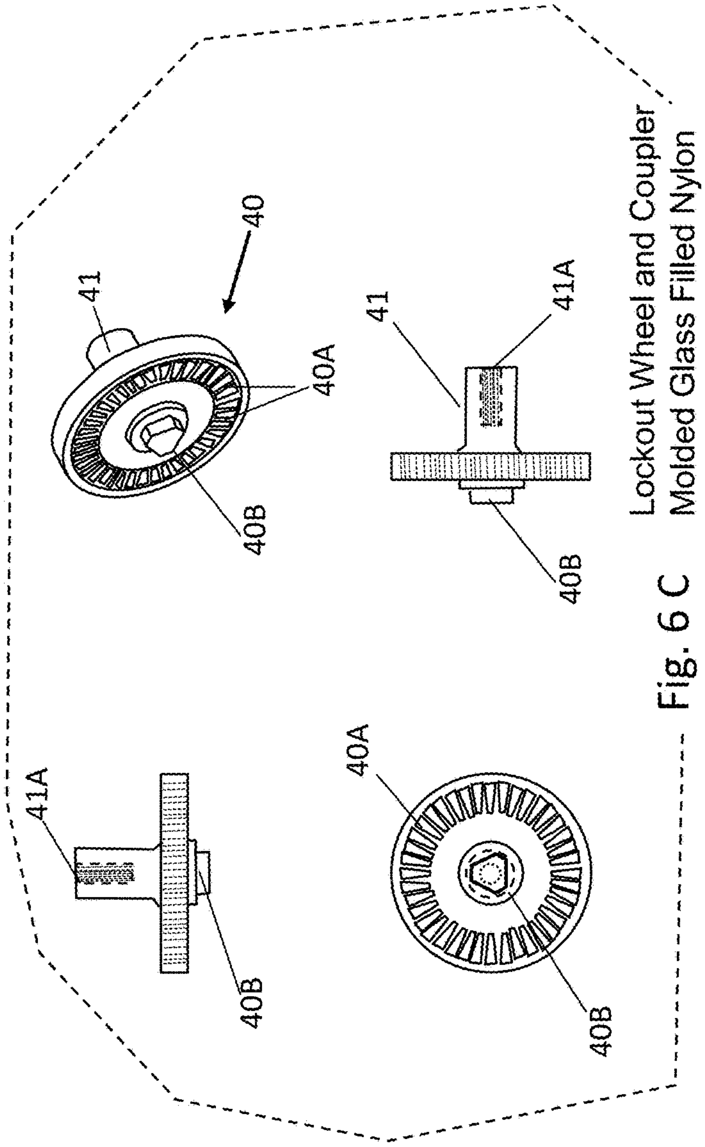

FIG. 6A through 6C are sketches of the lock out wheel and coupler 40 for the powered and cordless box wrench device 30. One can view here the following components and features: a lockout wheel 40; a lockout slots 40A; a couple hub 40B; a lockout wheel hub 41; and a lockout wheel aperture 41A.

Figure 7A:
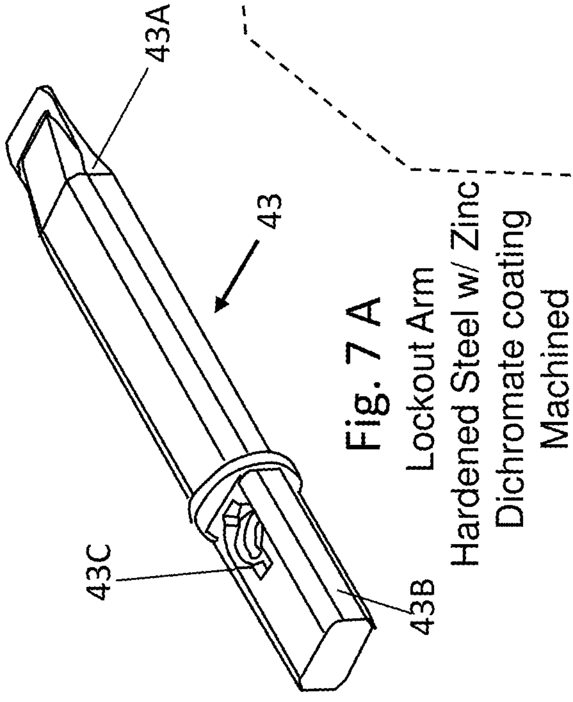
FIGS. 7A and 7B are sketches of the lock out arm used for the powered and cordless box wrench device.
Figure 7B:
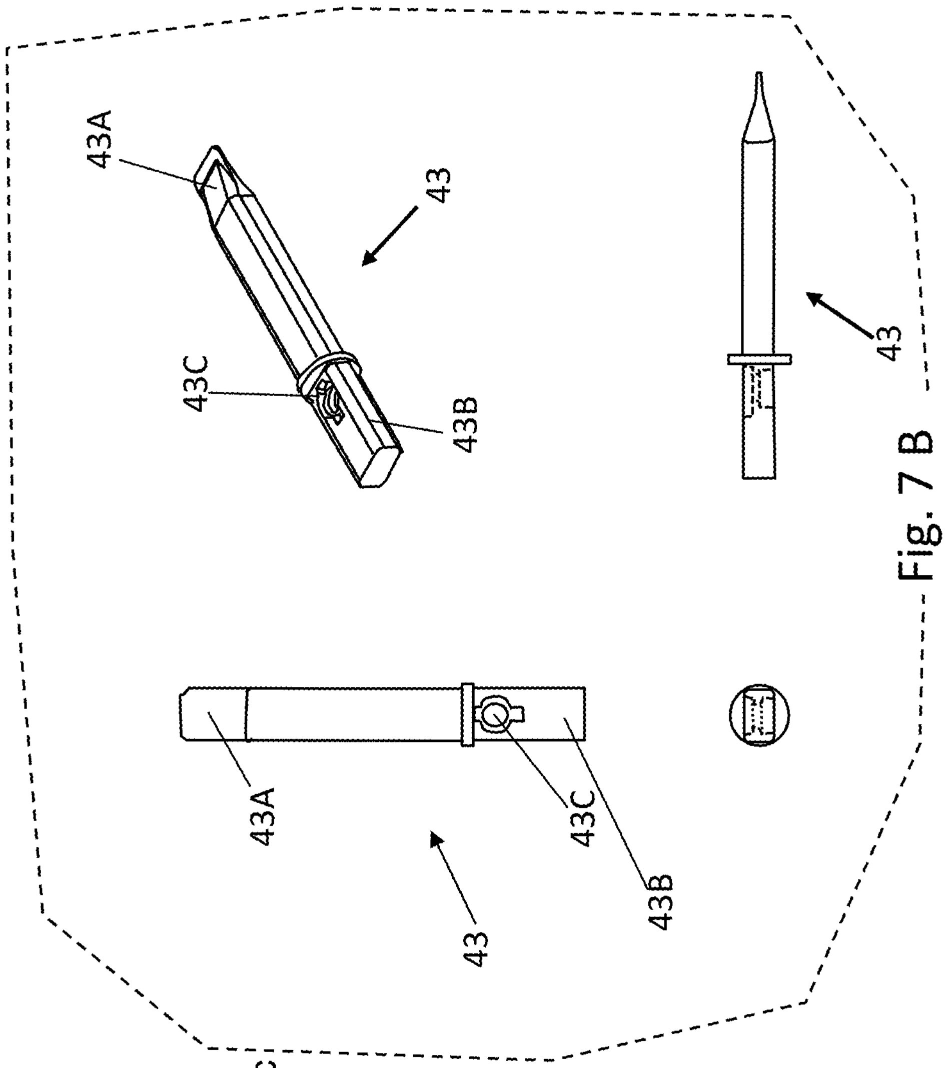

FIGS. 7A and 7B are sketches of the lock out arm 43 used for the powered and cordless box wrench device 30. Demonstrated here are the following: a lockout arm 43; a lockout wheel chisel 43A; a lockout arm extension 43B; and a lockout arm opening 43C.

Figures 8A, 8B:
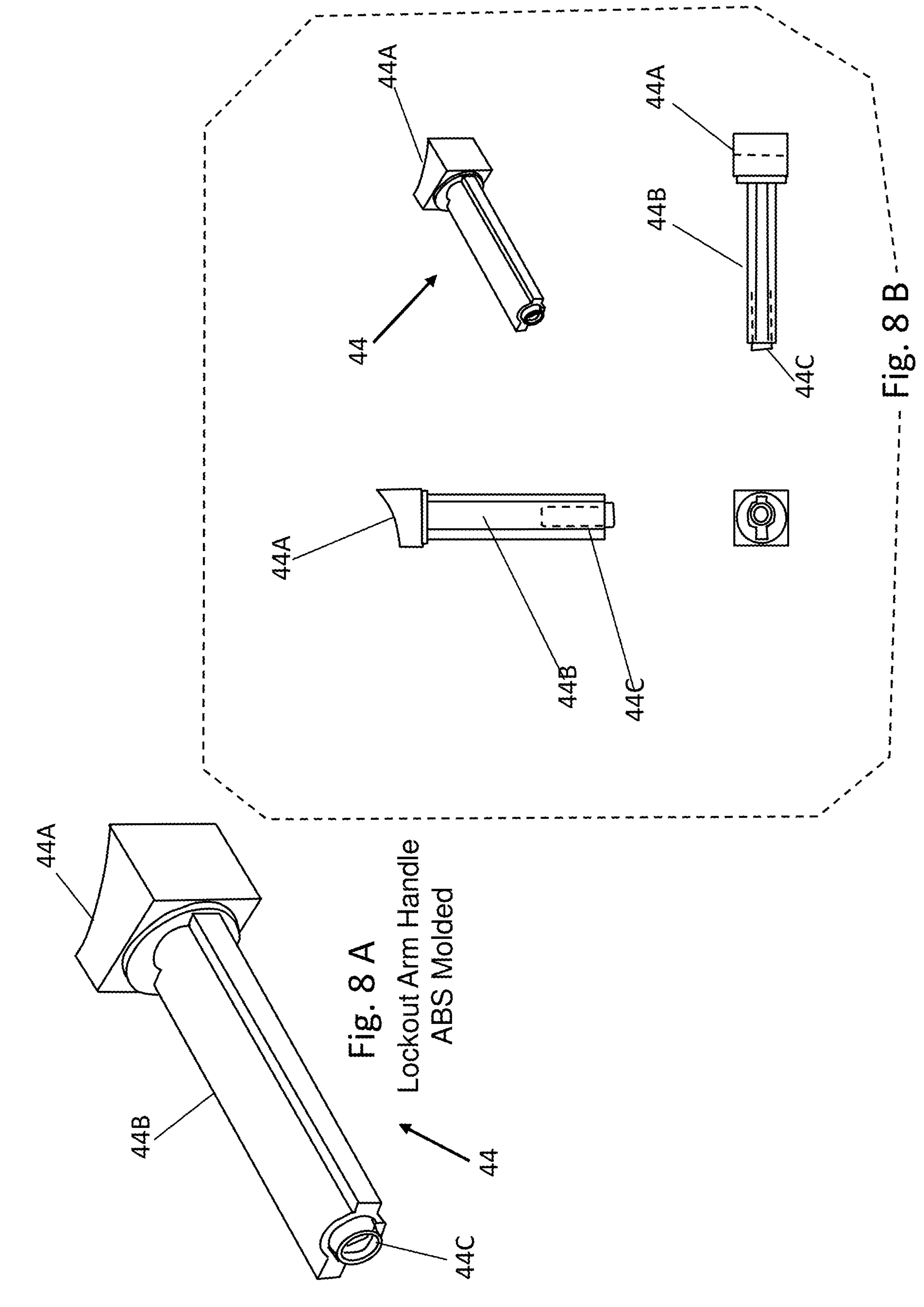
FIGS. 8A and 8B are sketches of the lock out arm handle used with the lockout arm for the powered and cordless box wrench device.

FIGS. 8A and 8B are sketches of the lock out arm handle 44 used with the lockout arm 43 for the powered and cordless box wrench device 30. In these sketches one sees: a lockout arm handle 44; a grip button 44A; a shaft 44B; and an extension 44C. The lockout arm and handle can be made of durable materials such as metals—steel alloys, nickel, brass, pot metals, aluminum, titanium and the like and polymers such as fairly high durometer, urethane, nylon, reinforced nylon, polyvinyl chloride (PVC), silicone, thermoplastic elastomers (TPE), Acrylonitrile Styrene (ASA); Acrylonitrile Butadiene Styrene (ABS) Plastic; polycarbonate—Acrylonitrile Butadiene Styrene (PC-ABS); polylactic acid (PLA); Polyamide (PA-nylon), Glass Filled Polyamide, Acrylonitrile Styrene (ASA); Acrylonitrile Butadiene Styrene (ABS) Plastic; polycarbonate—Acrylonitrile Butadiene Styrene (PC-ABS); polylactic acid (PLA); Polyamide (PA-nylon), Glass Filled Polyamide, and composite materials and the like.

Figures 9A, 9B:
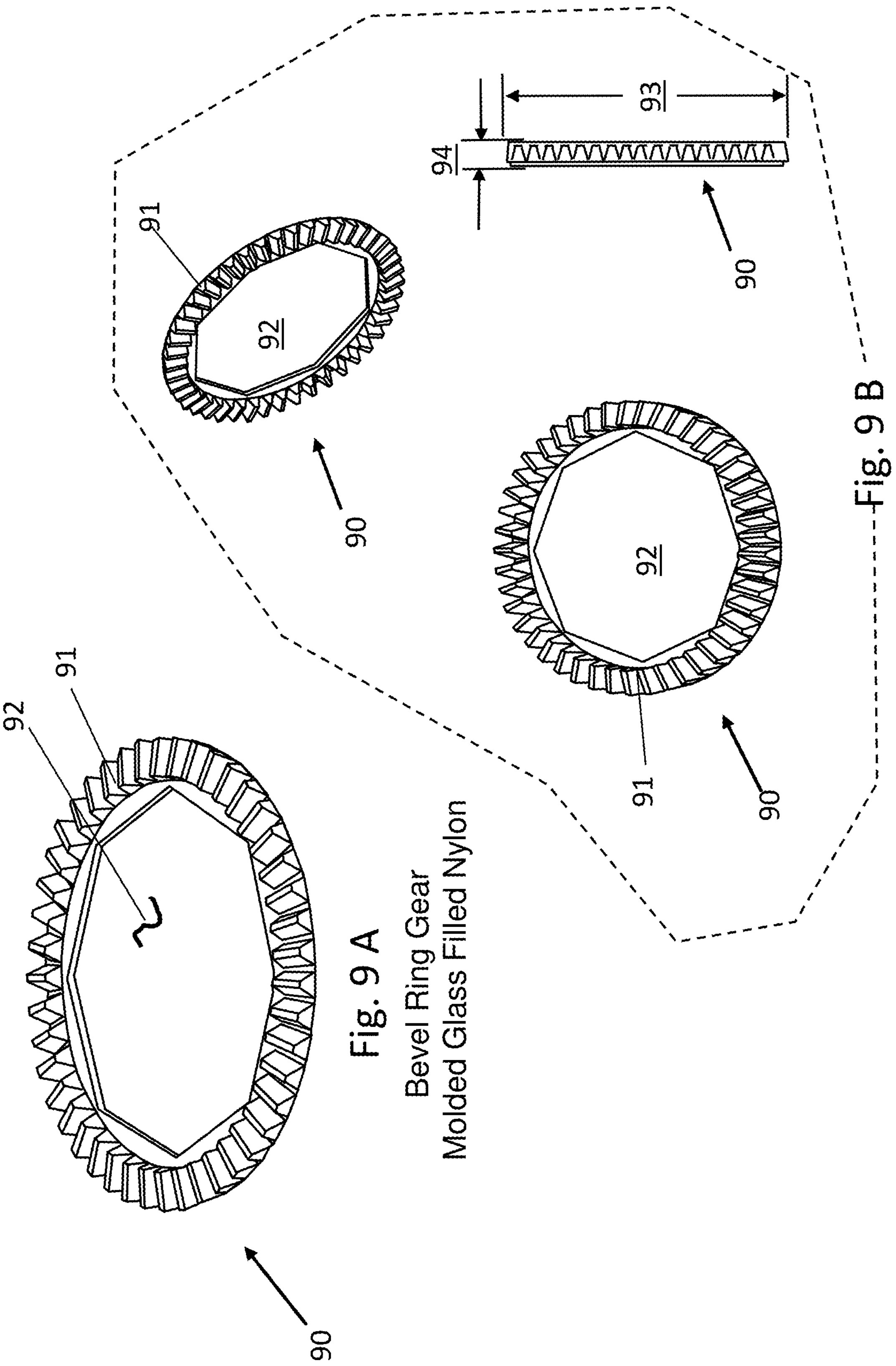
FIGS. 9A and 9B are sketches of the bevel ring gear for the powered and cordless box wrench device.

FIGS. 9A and 9B are sketches of the bevel ring gear 90 for the powered and cordless box wrench device 30. Demonstrated in these two views are: a bevel ring gear 90; a tooth 91 of ring gear 90; an internal aperture/hex 92; a diameter 93; and a thickness 94.

Figures 10A, 10B:
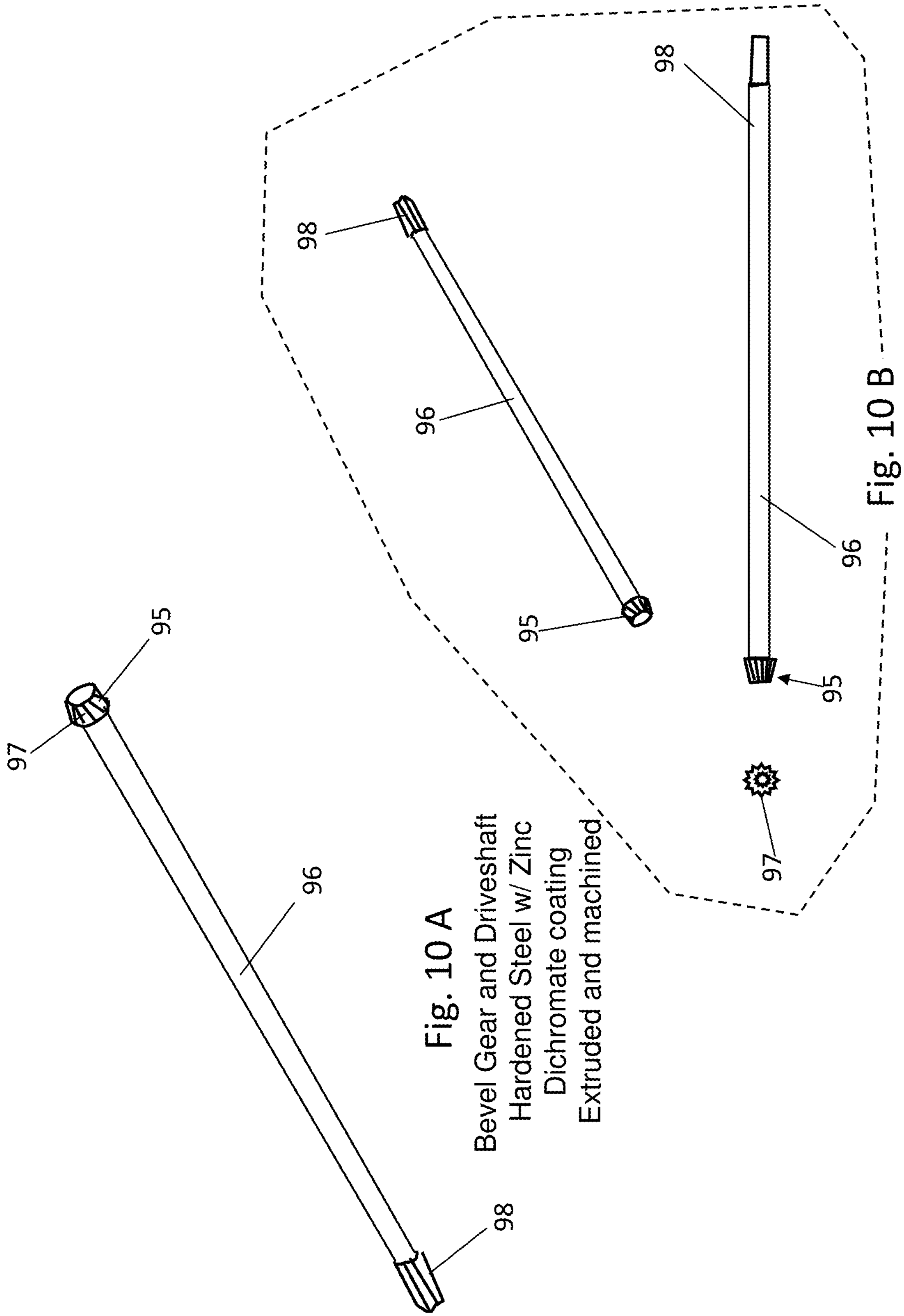
FIGS. 10A and 10B are sketches of the bevel gear and driveshaft for the powered and cordless box wrench device.

FIGS. 10A and 10B are sketches of the bevel pinion gear 95 and driveshaft 96 for the powered and cordless box wrench device 30. Included in these views are the following: a bevel gear 95; a drive shaft 96; a bevel gear tooth 97; and a spline 98. The gears and rings can be made of durable materials such as metals—steel alloys, nickel, brass, pot metals, aluminum, titanium and the like and polymers such as fairly high durometer, urethane, nylon, reinforced nylon, polyvinyl chloride (PVC), silicone, thermoplastic elastomers (TPE), Acrylonitrile Styrene (ASA); Acrylonitrile Butadiene Styrene (ABS) Plastic; polycarbonate—Acrylonitrile Butadiene Styrene (PC-ABS); polylactic acid (PLA); Polyamide (PA-nylon), Glass Filled Polyamide, and composite materials and the like.

Figure 11C:
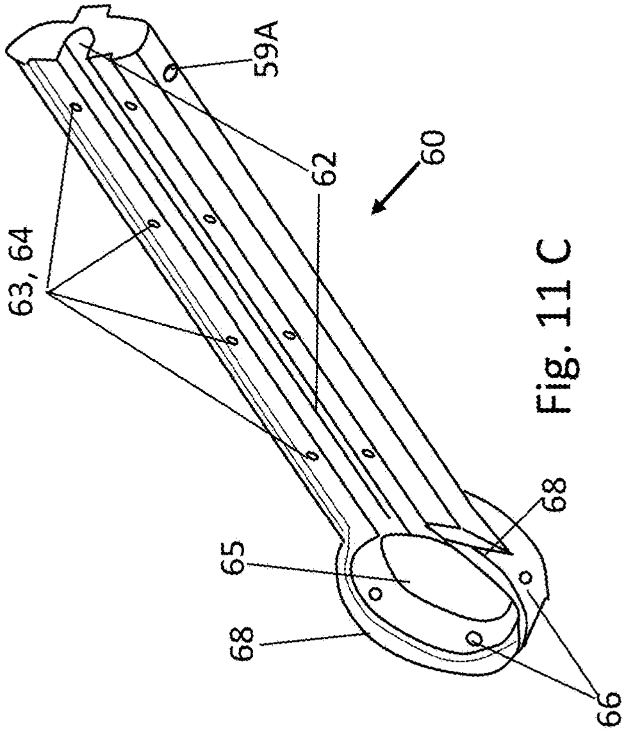
FIG. 11A through 11C are sketches of the tool head frame for the powered and cordless box wrench device.
Figure 11A:
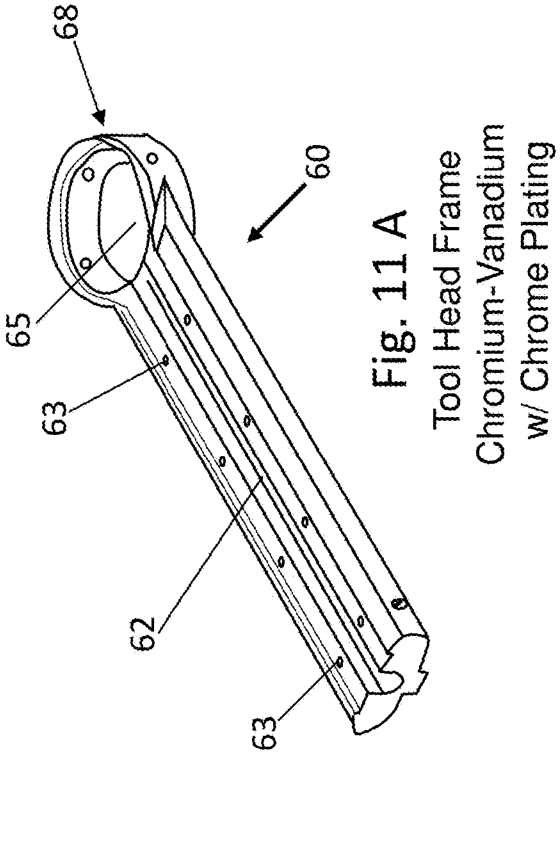
Figure 11B:
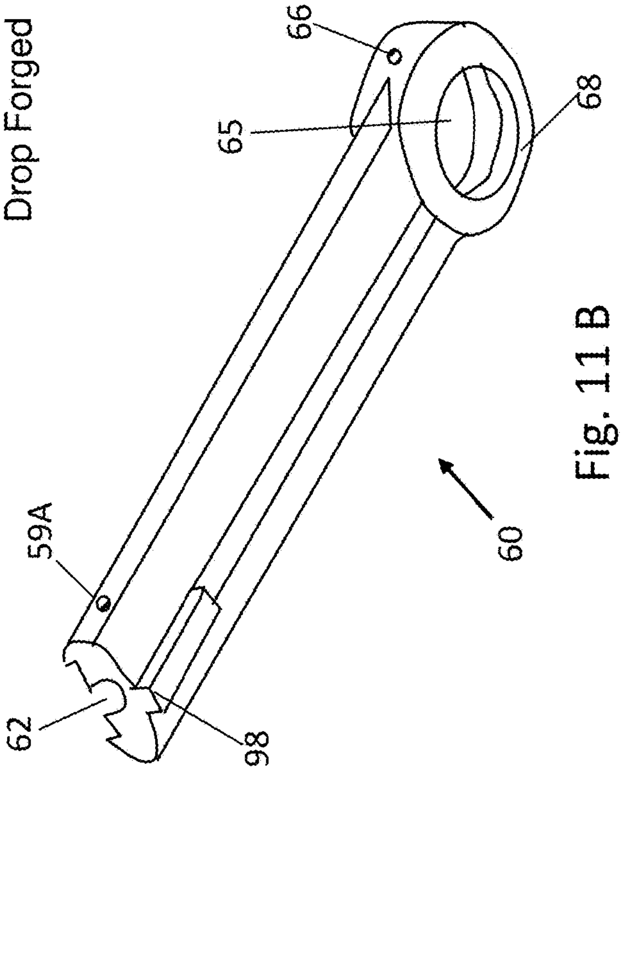

FIG. 11A through 11C are sketches of the tool head frame 60 for the powered and cordless box wrench device 30. Portrayed here are: a tool head frame 60; a recess 62 for drive shaft; an insert aperture 63 for means for connecting 64—aperture as threaded, slot, or flap; an opening/aperture 65 for insert 58; an opening 66 for ball plunger 59; and a hex insert container 68.

Figures 12A, 12B, 12C:
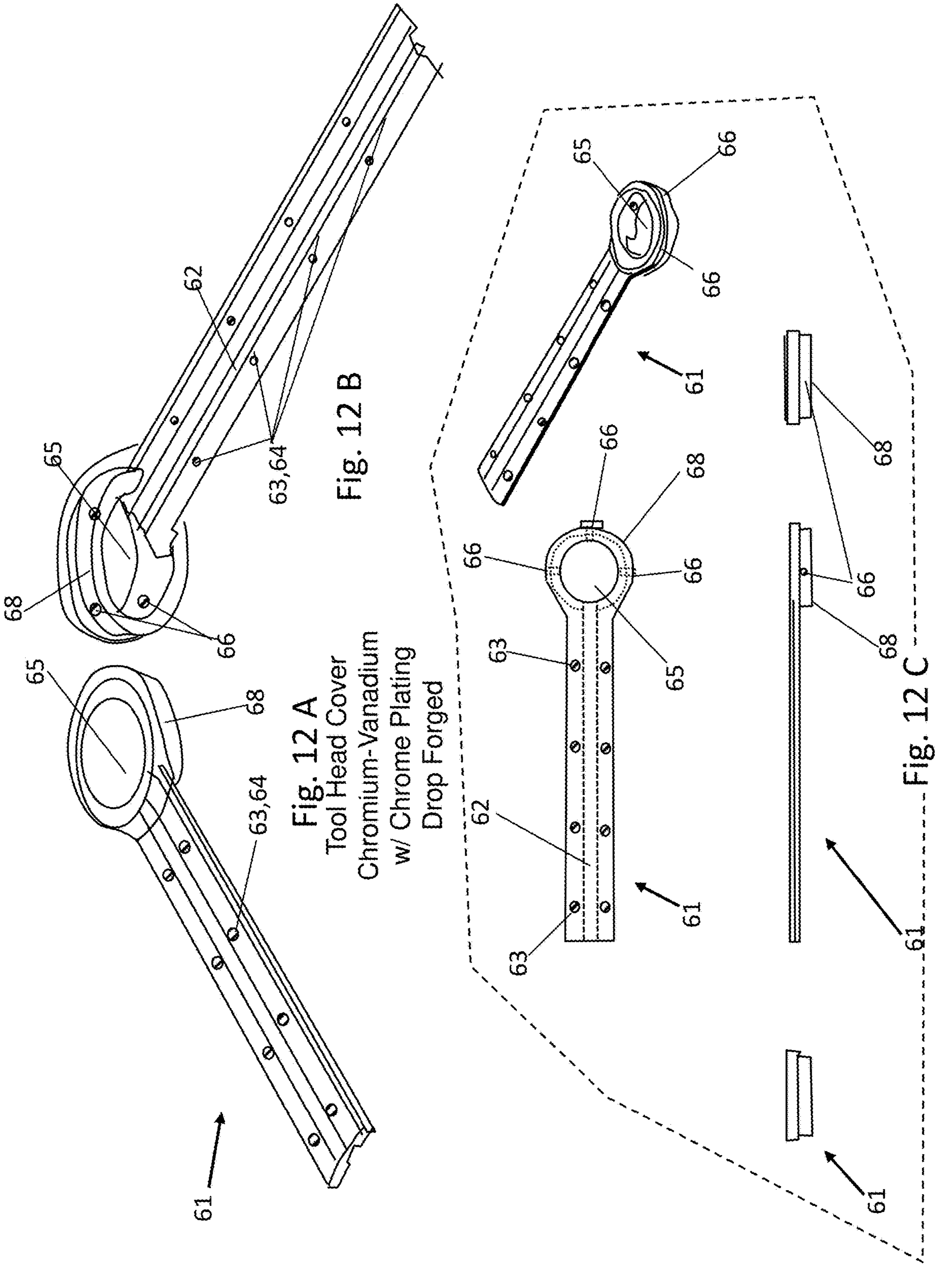
FIG. 12A through 12C are sketches of the tool head cover for the tool head frame for the powered and cordless box wrench device.

FIG. 12A through 12C are sketches of the tool head cover 61 for the tool head frame 60 for the powered and cordless box wrench device 30. Depicted here are the following components and features: a tool head cover 61; a means for connecting 64 such as threaded fasteners, screws, bolts, tabs, barbs, etc.; an opening/aperture 65 for insert 58; an opening 66 for ball plunger 59; and a hex insert container 68. One notes the tool head cover and the tool head frame is anticipated to be made of durable materials such as but not limited to steel alloys, nickel, brass, pot metals, aluminum, titanium and the like.

Figure 13B:
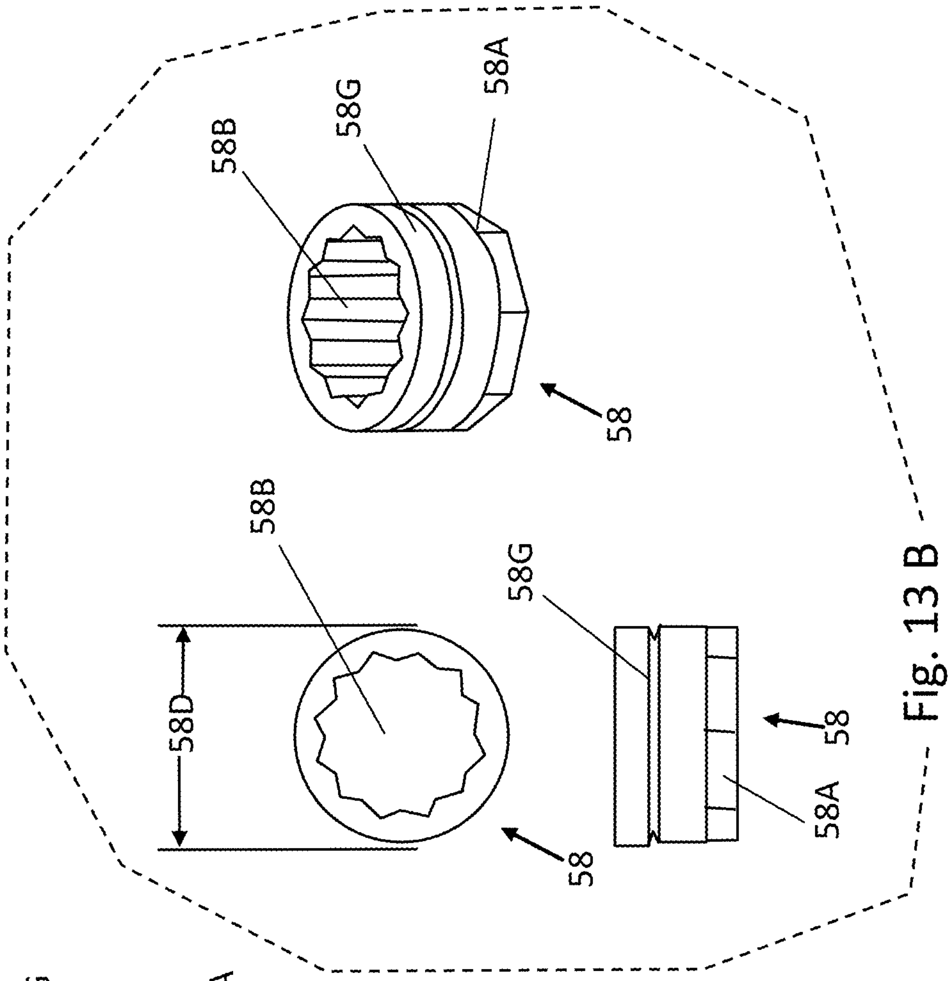
FIGS. 13A and 13B are sketches of a typical hex insert for the powered and cordless box wrench device.
Figure 13A:
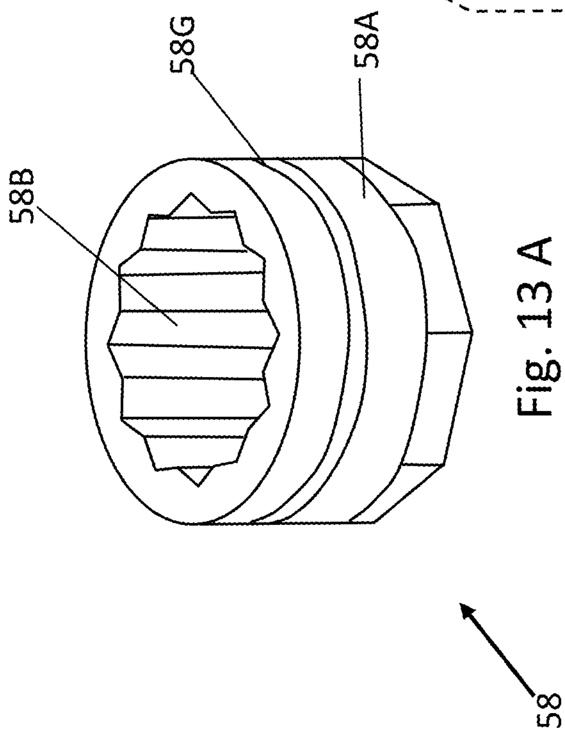

FIGS. 13A and 13B are sketches of a typical hex insert 58 for the powered and cordless box wrench device 30. Represented in these sketches are a hex insert 58; an external drive flats 58A for hex insert 58; a hex opening 58B for hex fasteners; a diameter 58D; and a ball groove 58.

Figure 14A:
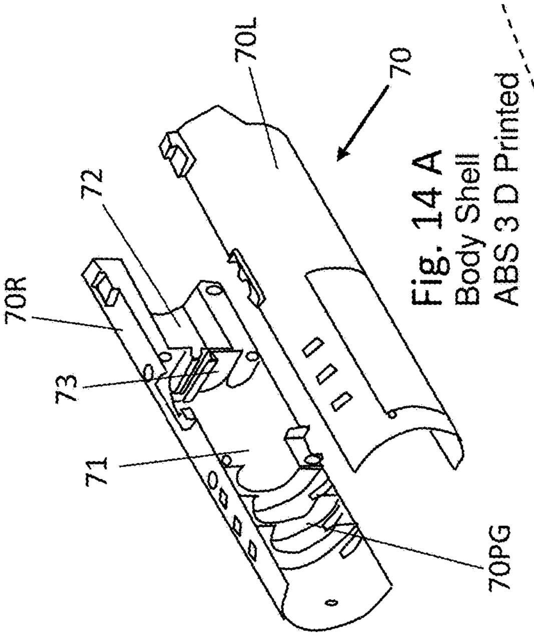
FIGS. 14A and 14B are sketches of the body shell for the powered and cordless box wrench device.
Figure 14B:
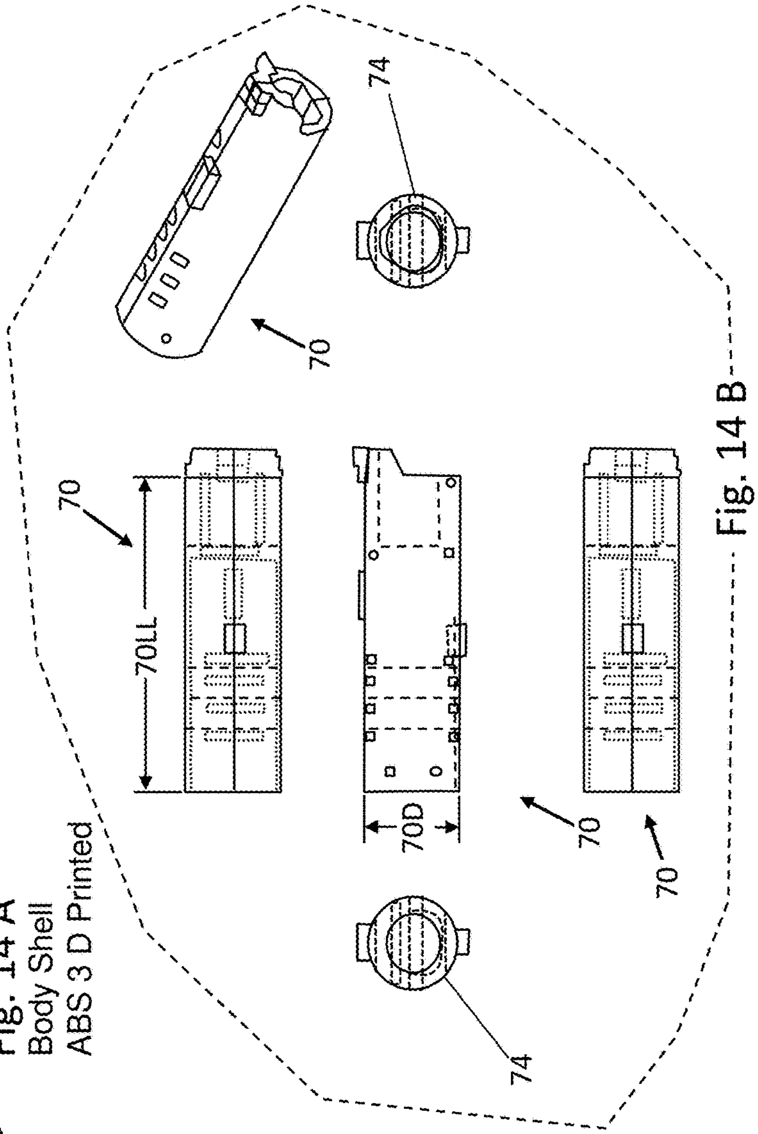

FIGS. 14A and 14B are sketches of the body shell 70 for the powered and cordless box wrench device 30. Exemplified in these views are representations of the following components and features: a body shell 70; a left hand 70L body shell 70; a right hand 70R body shell 70; a length 70LL; a diameter 70D; a planetary recess 70PG; a motor cavity 71; a battery cavity 72; a switch cavity 73; and a battery pack container 74.

Figures 15A, 15B, 15C:
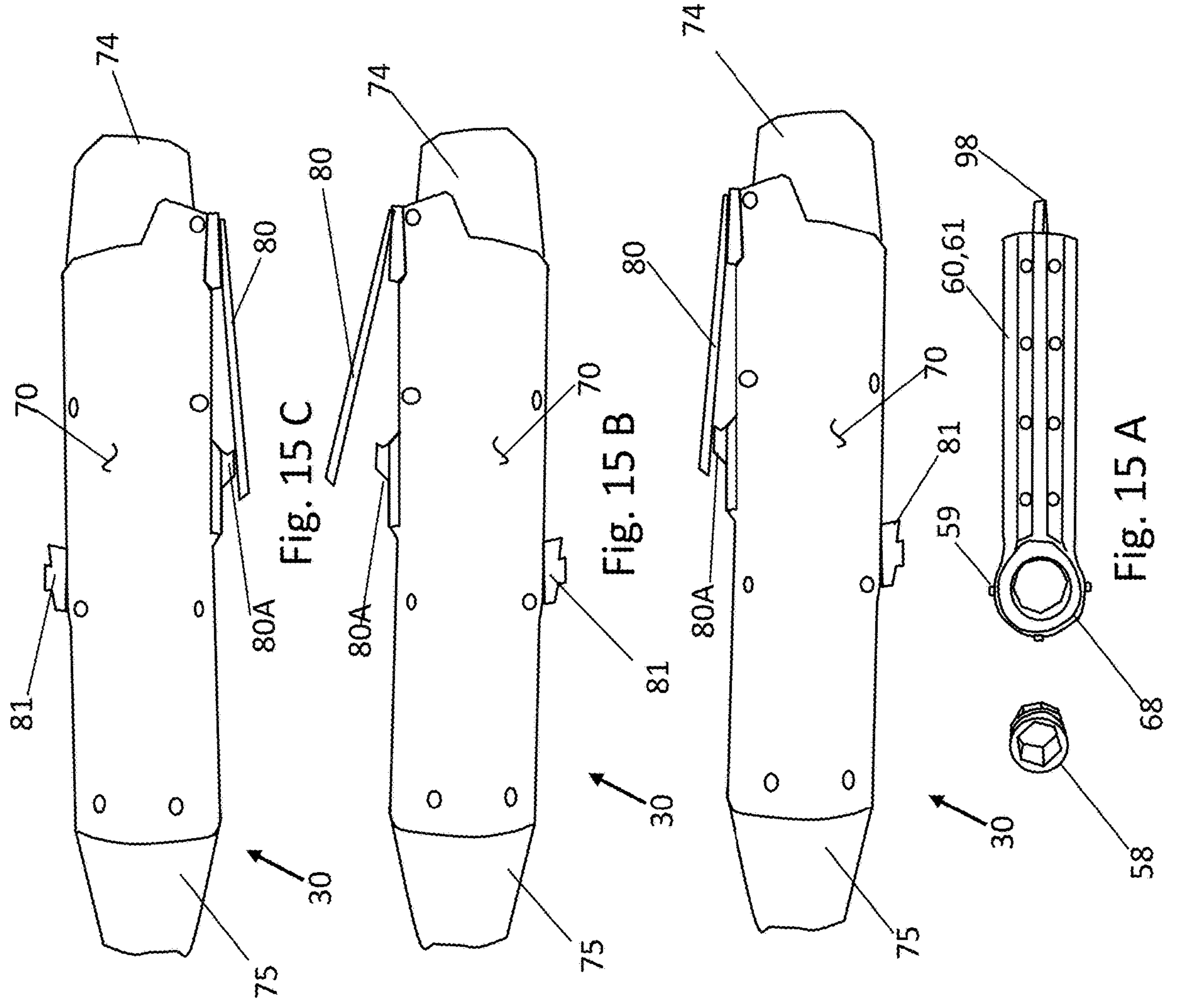
FIG. 15A through 15C are sketches of the body and tool frame for the powered and cordless box wrench device.

FIG. 15A through 15C are sketches of the body 70 and tool frame 60,61 for the powered and cordless box wrench device 30. Shown here are: a powered cordless device 30 for turning hard to reach fasteners; a grip button 44A; a hex insert 58; a hex insert ball plunger 59; a tool head frame 60; a tool head cover 61; a hex insert container 68; a body shell 70; a battery pack container 74; a body cone 75; a power button 80A; a power button arm 80; a polarity switch button 81; and a spline 98.

Figures 16A, 16B, 16C:
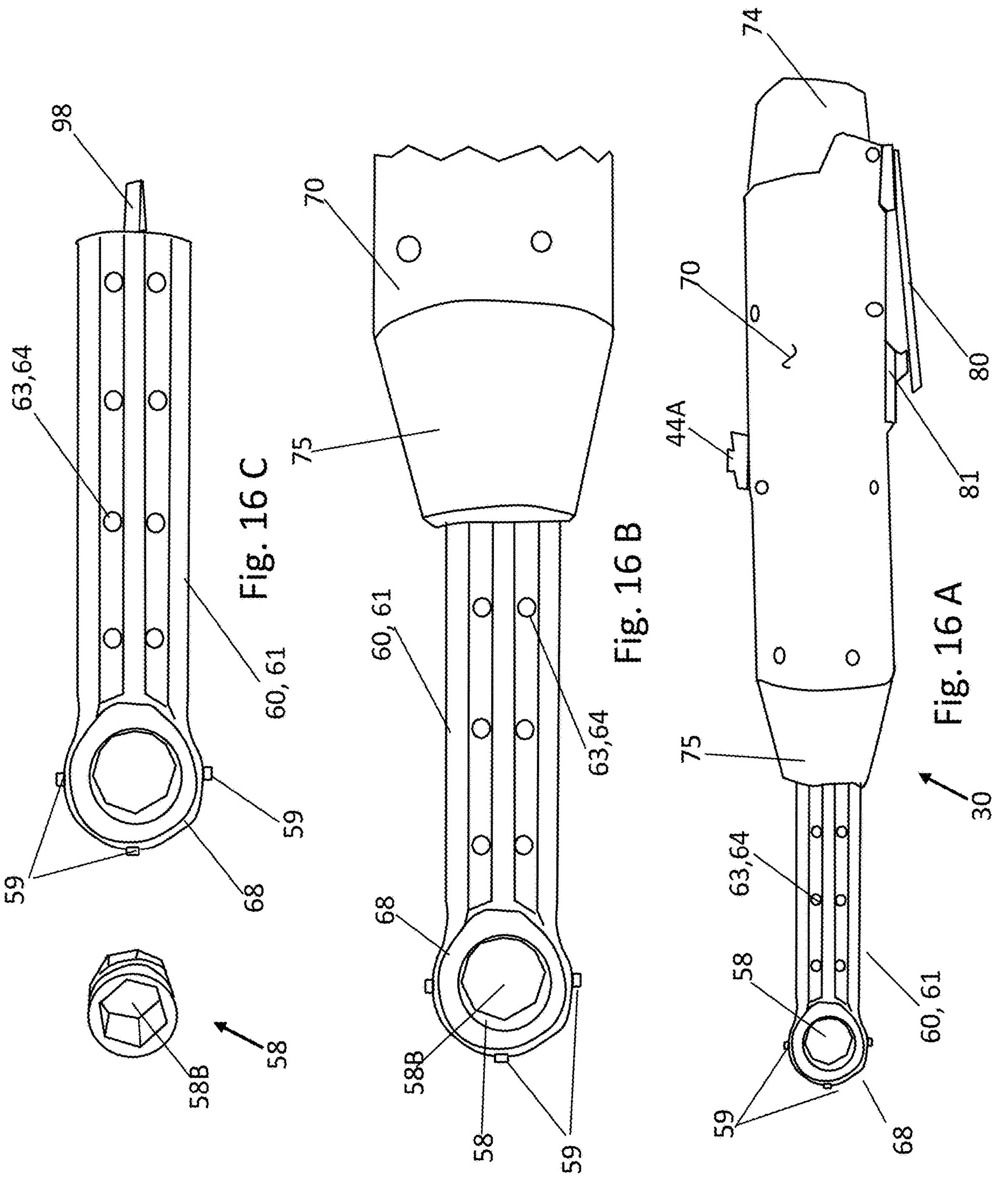
FIG. 16A through 16C are sketches of the body and especially the tool frame and insert of the powered and cordless box wrench device.
Figures 17A, 17B, 17C, 17D, 17E, 17F:
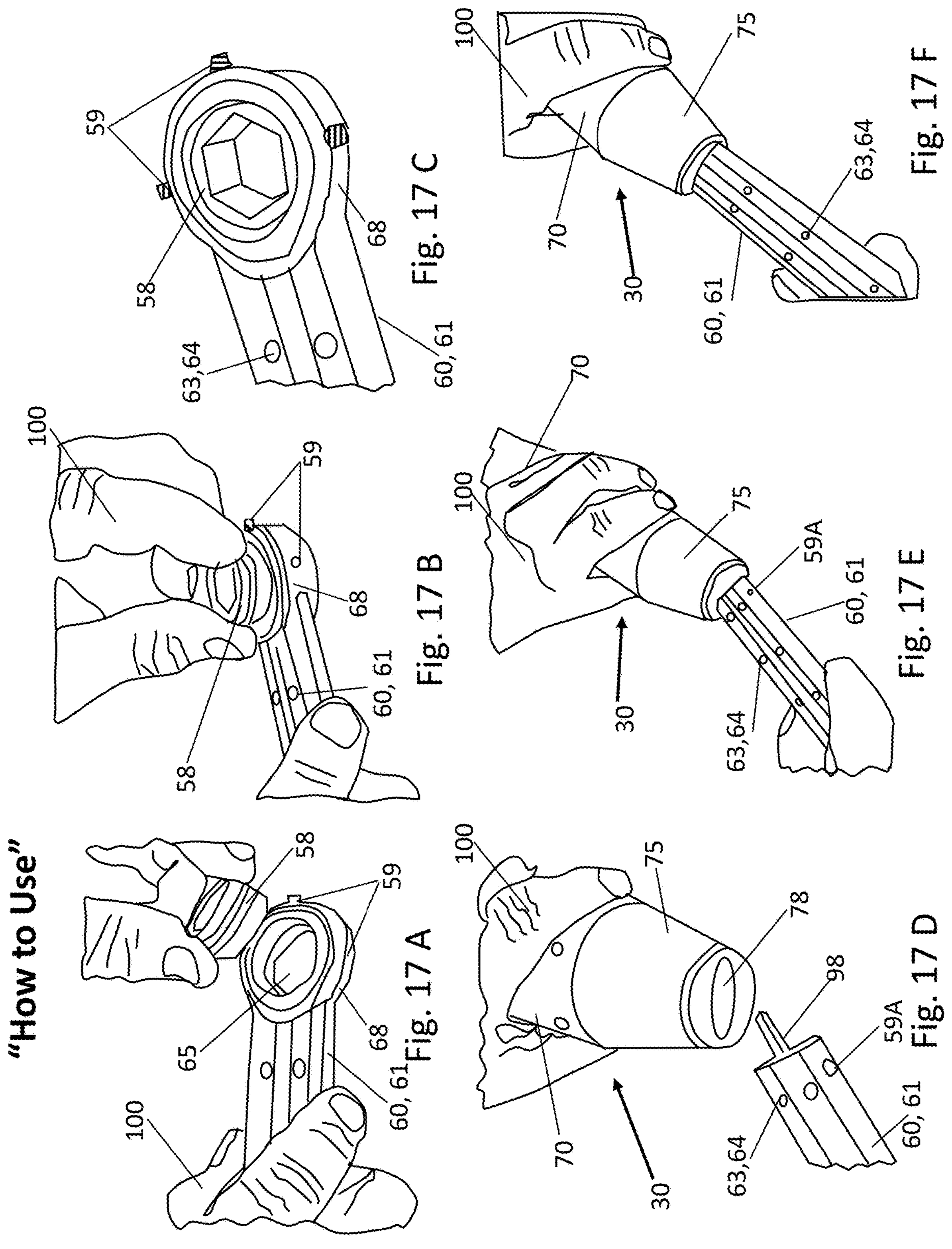
FIG. 17A through 17F are sketches of an operator using the powered and cordless box wrench device.

FIG. 16A through 16C are sketches of the body 70 and especially the tool frame 60,61 and hex insert 58 of the powered and cordless box wrench devices 30. Presented here are the following components and features of the device 30: a powered cordless device 30 for turning hard to reach fasteners; a grip button 44A; a hex insert 58; a hex opening 58B for hex fasteners; a hex insert ball plunger 59; a tool head frame 60; a tool head cover 61; an opening 66 for ball plunger 59; a hex insert container 68; a body shell 70; a power button 80A; a power button arm 80; a polarity switch button 81 and polarity switch 84; and a spline 98.

FIG. 17A through 17F are sketches of an operator using the powered and cordless box wrench device. These are described below in the operation section.

Further descriptions of the parts and components aforementioned are: the Hex insert 58 is an interchangeable insert ring with a hex-shaped opening that "snaps" into the tool head 60,61 at the insert container 68 and the hex insert 58 is the part of the device 30 that actually makes contact with the bolt/fastener; the tool head cover 61 as the name suggests covers the tool head frame 60 and allows for access to drive shaft 96 and bevel gear 95 assembly; the tool head frame 60 retains bevel gear 95 assembly, drive shaft 96 and bushings and acts as the "wrench body" portion of the device 30; the body cone 75 receives and holds the tool head frame 60, 61 and houses the lockout wheel 40 and lockout wheel bearing 42; the body shell 70 retains the motor 85, planetary gear assembly 45,47,48,49, trigger 80,81, polarity switch 84 and lockout arm 43 and provides a means of grasping the device 30; the hex insert ball plunger 59 is a set of threaded ball plungers that screw into tool frame 60 and retains the hex insert 58; the bevel ring gear 90 transfers the rotational motion of the drive shaft 96 through the bevel gear 95 at ninety degrees (90°) to rotational motion of the fastener; the bevel pinion or bevel gear 95 transfers the rotational motion of the drive shaft 96 to the bevel ring gear 90; the planetary carrier 45 outputs the rotational motion of the planetary gears 48 and also retains the gears 48 from escaping the ring gear 47 on the output side; the lockout wheel 40 provides a means of interference with the drive train via the lock arm 43 and allows the user to "lock" the drive train when the lockout arm 43 is inserted in one of the slots 40A on the lockout wheel 40 by pressing the grip button 44A; the lockout wheel bearing 42 facilitates the rotational motion of the lockout wheel 40 within the body cone 75; the polarity switch 84 is a three (3) position switch that allows the user to choose forward, reverse or kill the power to the motor 85; the motor 85 is a DC 12, 18 or 18 Volt (or the like) motor with a sun gear on the output shaft and the motor 85 provides the rotational motion of the drive train; the ring gear retainer 49 prevents the ring gear 47 of the planetary gear assembly from rotation; the planetary gears 48 are three (3) planetary gears which transmit the output of the motor 85 (via the sun gear) to the planetary carrier 45 and the planetary ring gear 47 retains the planetary gears 487 in the radial direction and provides a "track" for the planetary gears 48 to rotate/turn/revolve within;

The prototype of the product was designed for testing purposes and to prove the technology. With that being said, the tool was started by harvesting the motor, controller/trigger, planetary and batteries from an existing, similar tool. However, to incorporate the lockout feature, a wheel was designed and machined to allow for the feature to work properly but this increased the overall diameter of the tool. Also, the coupler was integrated into this piece to reduce the number of parts from DFA/DFM, but the driver was made separately and pressed into the tool, differentiating from the one-piece design. The coupler was changed to a hex, causing the shaft to be changed from the final design as well. The body cone and tool head share the same design change from the final design to the prototype, which was the elimination of the locating tab. This was deemed unnecessary as the tool would be reversible by a reverse polarity switch between the trigger and the DC motor and would not need to be flipped over to change drive direction. The cone on its own would also be changed by having a hole drilled through it to create a location for the ball catches in the tool head to engage and locking the head into the tool. The tool changed from the use of a snap fit cover to a screwed-in one to allow for removal the cover. The ball catches 59 in the tool head 60 are to hold the inserts 58. The pinion 95 on the one end of the drive shaft 96 could have an addition of a flange on the back of the gear and the reduction in length. The prototype was primarily made from existing parts, 3D printed parts, and CNC machined parts from 1018 cold rolled steel. However, the production model of the tool can consist of less machined parts and incorporate more processes for the manufacture of the internal parts. For example, the lockout wheel would be a perfect part for powdered metal and the ring gear in the tool head would be a great part for a 30% glass filled nylon.

Other Features include: CNC machined steel internal parts possess the ability to withstand 100 foot pounds of user applied torque; a user will be able to activate the Lock Out arm 43, which locks the entire system, allowing for tool to act as a traditional box wrench; ball plungers 59 allow for quick size changes of inserts and tool head 68, but provide a strong grab to stay in place; and Oilitertm and sealed bearings allow for reduced maintenance. The customer requirements include that the device 30 be: Lightweight; Durable; Powerful; ergonomically designed; Compact; Automatic; usable with Metric & SAE capability; and Low Noise.

Performance characteristics are: the ability to fit in tight locations (defined as 1.5"x1" Square); speed of approximately two hundred (200) RPM; Machine induced twenty five to fifty (25 to 50) foot pounds of torque; able to have manual Torque with a Locking Feature up to a Maximum of approximately two hundred and fifty (250) foot pounds; greater than two (2) hours of intermittent use of battery life; and a corrosion resistant frame encased by hardened plastic shell for ergonomics. Also, a six inch of reach from hand w/o extension and greater than eight inches of reach from hand w/extension; a 360-degree Range of motion. Finally, a product that was reliable, versatile, appealing, and strong tool. The tool would need to be designed so that anyone could purchase the tool and be able to operate it with minimal effort. The tool would need to compact and versatile to be able to reach fasteners in tight locations. It would also need to be able to produce an output that would loosen and tighten a fastener. The tool would need to be strong enough to withstand the torque applied from a user when using a manual lock out feature to use the tool as a traditional box wrench. The tool should be able to transition quickly from one bolt head size to another, with minimal effort by the operator. However, the tool should remain intact during use, and be able to outlast the life of the lithium ion batteries or equal. The tool should also be able to reverse directions either electronically or manually The details mentioned here are exemplary and not limiting. Other specific components and manners specific to describing a powered and cordless box wrench device 30 to ease difficulty in turning hard-to-reach fasteners may be added as a person having ordinary skill in the field of the art of powered tools, wrenches and like devices and their uses well appreciates.

Operation of the Preferred Embodiment

The powered and cordless box wrench device 30 to ease difficulty in turning hard-to-reach fasteners has been described in the above embodiment. The manner of how the device operates is described below. One notes well that the description above and the operation described here must be taken together to fully illustrate the concept of the powered and cordless box wrench device 30. The preferred embodiment of a powered and cordless box wrench device to ease difficulty in turning hard-to-reach fasteners A powered cordless device 30 for turning hard to reach fasteners comprised of: (a) a hex insert 58 with retention features and a hex opening 58B for hex fasteners; (b) a tool head frame 60 and a tool head cover 61 with a recess 62 for a drive shaft, with a means for connecting 64 the cover to the frame, and with a hex insert container 68 with a set of hex insert ball plungers 59; (c) a body cone 75 with an aperture 78; (d) a body shell 70 with a left hand 70L body shell 70 and a right hand 70R body shell 70 that contain a set of internal cavities and with a battery pack container 74; (e) at least one battery 72A, a polarity switch 84 and a polarity switch button 81, a power button 80A and a power button arm 80, and a motor 85 with a means 85A for motor 85 to drive a set of planetary gears 48; (f) a planetary carrier 45 with a means for interconnecting with a couple hub 40B, a planetary ring gear 47, the set of planetary gears 48, and a ring gear retainer 49; (g) a lockout wheel 40 with slots 40A, with a bearing 42, with an aperture for receiving a spline 98, and with the couple hub 40B; (h) a lockout arm 43 and handle 44; (i) a drive shaft 96 with the spline 98 at one end and a bevel gear 95 at an opposite end, the bevel gear 95 having a set of teeth 97 to engage a bevel ring gear 90; (j) a ball plunger 59A on the tool head 60,61 to removably secure the spline 98; and (k) the bevel ring gear 90 with a set of teeth 91 to engage the bevel gear 95 and with an internal aperture/hex 92 to engage the insert 58 wherein the hex insert 58 may be removably secured by the tool head 60, 61 and driven by the motor, planetary gears and drive shaft to ease the difficulty in turning hard to reach fasteners.

The powered and cordless box wrench device 30 operates in a simple manner. First one should confirm the batteries 72A are in a good state of charge by simply engaging the power button arm 80 and power button 80A. Next, a hex insert 58 of the appropriate size (SAE or Metric) is placed into the powered cordless device 30 at the end opposite the body 70 in the opening 65 of the hex insert container 68 of the tool frame and cover 60, 61. It is held by the ball inserts 59 that have been previously placed in the apertures 66 of the hex insert container 68. The direction of forward or reverse is selected on the polarity switch 84. Then the insert 58 is then placed on a fastener and the power button arm 80 is engaged to turn the hex insert 58. If needed the polarity switch 84 can be changed and the fastener turned in the opposite direction.

FIG. 17A through 17F are sketches of an operator 100 using the powered and cordless box wrench device 30. The sketches are self-explanatory once one sees the components featured which are: a powered cordless device 30 for turning hard to reach fasteners; a hex insert 58; an external drive flats 58A for hex insert 58; a hex insert ball plunger 59; a ball plunger 59A for tool head 60,61 at spline 98; a tool head frame 60; a tool head cover 61; an opening/aperture 65 for insert 58; an opening 66 for ball plunger 59; a hex insert container 68; a body shell 70; a body cone 75; a spline 98; and an operator 100 using powered and cordless box wrench device 30.

Many uses are anticipated for the powered and cordless box wrench device 30 to ease difficulty in turning hard-to-reach fasteners. Some examples, and not limitations, are shown in the following Table.

| ITEM | DESCRIPTION |
|---|---|
| 1 | Automotive Technicians and automotive repair shops |
| 2 | Motor sports Mechanics and Race Shops |
| 3 | Power sports Mechanics |
| 4 | Machine Maintenance Technicians and factories |
| 5 | Contractors and construction sites |
| 6 | Do-It-Yourselfers |
| 7 | Anyone regularly working with fasteners both indoors and outdoors |

With this description it is to be understood that the powered and cordless box wrench device 30 to ease difficulty in turning hard-to-reach fasteners is not to be limited to only the disclosed embodiment of product. The features of the powered and cordless box wrench device 30 are intended to cover various modifications and equivalent arrangements included within the spirit and scope of the description.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described above in the foregoing paragraphs.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. Various features and aspects of the disclosed embodiments can be combined with or substituted for one another to form varying modes of the disclosed inventions. Thus, it is intended that the scope of at least some of the present inventions herein disclosed should not be limited by the particularly disclosed embodiments described above.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any embodiment, feature, or combination of features shown herein. This is true even if only a single embodiment of the feature or combination of features is illustrated and described herein. Thus, the appended claims should be read to be given their broadest interpretation in view of the prior art and the ordinary meaning of the claim terms.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

The present invention contemplates modifications as would occur to those skilled in the art. While the disclosure has been illustrated and described in detail in the figures and the foregoing description, the same is to be considered as illustrative and not restrictive in character, it being understood that only selected embodiments have been shown and described and that all changes, modifications and equivalents that come within the spirit of the disclosures described heretofore and or/defined by the following claims are desired to be protected.

The invention claimed is:

1. A powered cordless device for turning hard to reach fasteners comprised of:

(a) a hex insert with retention features and a hex opening for hex fasteners;

(b) a tool head frame and a tool head cover with a recess for a drive shaft, with a means for connecting the cover to the frame, and with a hex insert container with a set of hex insert ball plungers;

(c) a body cone with an aperture;

(d) a body shell with a left hand body shell and a right hand body shell that contain a set of internal cavities and with a battery pack container;

(e) at least one battery, a power button and a power button arm, and a motor with a means for motor to drive a set of planetary gears;

(f) a planetary carrier and a couple hub wherein the planetary carrier is further comprising a planetary ring gear, the set of planetary gears, and a ring gear retainer and wherein the ring gear retainer interconnects with the couple hub;

(g) a lockout wheel with slots, with a bearing, with an aperture for receiving a spline, and with the couple hub;

(h) a lockout arm and handle;

(i) a drive shaft with the spline at one end and a bevel gear at an opposite end, the bevel gear having a set of teeth to engage a bevel ring gear;

(j) a ball plunger on the tool head to removably secure the spline; and (k) the bevel ring gear with a set of teeth to engage the bevel gear and with an internal aperture to engage the insert wherein the hex insert may be removably secured by the tool head and driven by the motor, planetary gears, and drive shaft to ease the difficulty in turning hard to reach fasteners wherein the lockout wheel allows a user to lock the rotational output when the lockout arm is inserted in one of the slots on the lockout wheel.

2. The powered cordless device in claim 1 for turning hard to reach fasteners further comprised with a polarity switch (84) and a polarity switch arm (81).

3. The powered cordless device in claim 2 for turning hard to reach fasteners wherein the means for connecting the cover to the frame is selected from the group consisting of threaded fasteners, screws, bolts, tabs, and barbs.

4. The powered cordless device in claim 2 for turning hard to reach fasteners wherein the material for the body cone and the body shell is selected from the group consisting of a metal and a polymer.

5. The powered cordless device in claim 4 for turning hard to reach fasteners wherein the metal is selected from the group consisting of steel alloys, nickel, brass, pot metals, aluminum, and titanium.

6. The powered cordless device in claim 4 for turning hard to reach fasteners wherein the polymer is selected from the group consisting of urethane, nylon, reinforced nylon, polyvinyl chloride (PVC), silicone, thermoplastic elastomers (TPE), Acrylonitrile Styrene (ASA); Acrylonitrile Butadiene Styrene (ABS) Plastic; polycarbonate—Acrylonitrile Butadiene Styrene (PC-ABS); polylactic acid (PLA); Polyamide (PA-nylon), Glass Filled Polyamide, and composite materials.

7. The powered cordless device in claim 2 for turning hard to reach fasteners wherein the materials for the tool head frame and the tool head cover is selected from the group consisting of steel alloys, nickel, brass, pot metals, aluminum, and titanium.

8. The powered cordless device in claim 2 for turning hard to reach fasteners wherein the at least one battery is selected from the group consisting of metal hydride battery, alkaline battery, lead-acid battery, lithium-ion battery, nickel-cadmium battery, nickel metal hydride, and zinc chloride battery.

9. The powered cordless device in claim 2 for turning hard to reach fasteners wherein the material for the lockout handle and the lockout arm is selected from the group consisting of steel alloys, nickel, brass, pot metals, aluminum, titanium, urethane, nylon, reinforced nylon, polyvinyl chloride (PVC), silicone, thermoplastic elastomers (TPE), Acrylonitrile Styrene (ASA); Acrylonitrile Butadiene Styrene (ABS) Plastic; polycarbonate —Acrylonitrile Butadiene Styrene (PC-ABS); polylactic acid (PLA); Polyamide (PA-nylon), Glass Filled Polyamide, and composite materials.

10. The powered cordless device in claim 2 for turning hard to reach fasteners wherein the material for the gears and rings is selected from the group consisting of steel alloys, nickel, brass, pot metals, aluminum, titanium, urethane, nylon, reinforced nylon, polyvinyl chloride (PVC), silicone, thermoplastic elastomers (TPE), Acrylonitrile Styrene (ASA); Acrylonitrile Butadiene Styrene (ABS) Plastic; polycarbonate—Acrylonitrile Butadiene Styrene (PC-ABS); polylactic acid (PLA); Polyamide (PA-nylon), Glass Filled Polyamide, and composite materials.

11. A powered cordless device for turning hard to reach fasteners, and comprised of:

(a) a hex insert with retention features and a hex opening for hex fasteners;

(b) a tool head frame and a tool head cover with a recess for a drive shaft, with a means for connecting the cover to the frame, and with a hex insert container with a set of hex insert ball plungers;

(c) a body cone with an aperture;

(d) a body shell with a left hand body shell and a right hand body shell that contain a set of internal cavities and with a battery pack container;

(e) at least one battery, a polarity switch, a polarity switch arm, and a power button and a power button arm, and a motor with a means for motor to drive a set of planetary gears;

(f) a planetary carrier and a couple hub wherein the planetary carrier is further comprising a planetary ring gear, the set of planetary gears, and a ring gear retainer and wherein the ring gear retainer interconnects with the couple hub;

(g) a lockout wheel with slots, with a bearing, with an aperture for receiving a spline, and with the couple hub;

(h) a lockout arm and handle;

(i) a drive shaft with the spline at one end and a bevel gear at an opposite end, the bevel gear having a set of teeth to engage a bevel ring gear;

(j) a ball plunger on the tool head to removably secure the spline; and (k) the bevel ring gear with a set of teeth to engage the bevel gear and with an internal aperture to engage the insert wherein the hex insert may be removably secured by the tool head and driven by the motor, planetary gears, and drive shaft to ease the difficulty in turning hard to reach fasteners wherein the lockout wheel allows a user to lock the rotational output when the lockout arm is inserted in one of the slots on the lockout wheel.

12. The powered cordless device in claim 11 for turning hard to reach fasteners wherein the means for connecting the cover to the frame is selected from the group consisting of threaded fasteners, screws, bolts, tabs, and barbs.

13. The powered cordless device in claim 11 for turning hard to reach fasteners wherein the material for the body cone and the body shell is selected from the group consisting of a metal and a polymer.

14. The powered cordless device in claim 13 for turning hard to reach fasteners wherein the metal is selected from the group consisting of steel alloys, nickel, brass, pot metals, aluminum, and titanium.

15. The powered cordless device in claim 13 for turning hard to reach fasteners wherein the polymer is selected from the group consisting of urethane, nylon, reinforced nylon, polyvinyl chloride (PVC), silicone, thermoplastic elastomers (TPE), Acrylonitrile Styrene (ASA); Acrylonitrile Butadiene Styrene (ABS) Plastic; polycarbonate—Acrylonitrile Butadiene Styrene (PC-ABS); polylactic acid (PLA); Polyamide (PA-nylon), Glass Filled Polyamide, and composite materials.

16. The powered cordless device in claim 11 for turning hard to reach fasteners wherein the materials for the tool head frame and the tool head cover is selected from the group consisting of steel alloys, nickel, brass, pot metals, aluminum, and titanium.

17. The powered cordless device in claim 11 for turning hard to reach fasteners wherein the at least one battery is selected from the group consisting of metal hydride battery, alkaline battery, lead-acid battery, lithium-ion battery, nickel-cadmium battery, nickel metal hydride, and zinc chloride battery.

18. The powered cordless device in claim 11 for turning hard to reach fasteners wherein the material for the lockout handle and the lockout arm is selected from the group consisting of steel alloys, nickel, brass, pot metals, aluminum, titanium, urethane, nylon, reinforced nylon, polyvinyl chloride (PVC), silicone, thermoplastic elastomers (TPE), Acrylonitrile Styrene (ASA); Acrylonitrile Butadiene Styrene (ABS) Plastic; polycarbonate—Acrylonitrile Butadiene Styrene (PC-ABS); polylactic acid (PLA); Polyamide (PA-nylon), Glass Filled Polyamide, and composite materials.

19. The powered cordless device in claim 11 for turning hard to reach fasteners wherein the material for the gears and rings is selected from the group consisting of steel alloys, nickel, brass, pot metals, aluminum, titanium, urethane, nylon, reinforced nylon, polyvinyl chloride (PVC), silicone, thermoplastic elastomers (TPE), Acrylonitrile Styrene (ASA); Acrylonitrile Butadiene Styrene (ABS) Plastic; polycarbonate—Acrylonitrile Butadiene Styrene (PC-ABS); polylactic acid (PLA); Polyamide (PA-nylon), Glass Filled Polyamide, and composite materials.

* * * * *